US011449665B2

(12) United States Patent
Irigoyen et al.

(10) Patent No.: US 11,449,665 B2
(45) Date of Patent: Sep. 20, 2022

(54) METHODS AND APPARATUS FOR SUPPORTING THE DISPLAY AND EDITING OF OOXML DOCUMENT CONTENT USING A WEB BROWSER

(71) Applicant: Accusoft Corporation, Tampa, FL (US)

(72) Inventors: Michael Irigoyen, Riverview, FL (US); Jamison Prianos, Land O Lakes, FL (US)

(73) Assignee: Accusoft Corporation, Tampa, FL (US)

( * ) Notice: Subject to any disclaimer, the term of this patent is extended or adjusted under 35 U.S.C. 154(b) by 0 days.

(21) Appl. No.: 16/359,739

(22) Filed: Mar. 20, 2019

(65) Prior Publication Data

US 2020/0293609 A1    Sep. 17, 2020

Related U.S. Application Data

(60) Provisional application No. 62/819,512, filed on Mar. 15, 2019.

(51) Int. Cl.
| | |
|---|---|
| *G06F 17/00* | (2019.01) |
| *G06F 40/14* | (2020.01) |
| *G06F 16/958* | (2019.01) |
| *G06F 40/106* | (2020.01) |
| *G06F 40/169* | (2020.01) |

(Continued)

(52) U.S. Cl.
CPC .......... *G06F 40/14* (2020.01); *G06F 16/986* (2019.01); *G06F 40/106* (2020.01); *G06F 40/169* (2020.01); *G06F 40/197* (2020.01); *H04W 88/02* (2013.01)

(58) Field of Classification Search
CPC ...... G06F 40/14; G06F 40/106; G06F 40/169; G06F 40/197; G06F 16/986; H04W 88/02
See application file for complete search history.

(56) References Cited

U.S. PATENT DOCUMENTS

2008/0288857 A1* 11/2008 Duncan ................... G06T 11/60
715/230
2009/0006454 A1* 1/2009 Zarzar .................. G06F 3/0482
(Continued)

OTHER PUBLICATIONS

Pohl et al., Efficient Creation of Multi Media eLearning Modules, 2007, LNCS 4558, pp. 457-465 (Year: 2007).*

(Continued)

*Primary Examiner* — Andrew T McIntosh
(74) *Attorney, Agent, or Firm* — Straub & Straub; Michael P. Straub; Stephen T. Straub

(57) ABSTRACT

Methods and apparatus for converting an OOXML file into a format which can be rendered, displayed and edited by a browser on a device such as a cell phone without the device having to directly work with the document in the OOXML format are described. In various embodiments the contents of an OOXML file are converted into a JSON object, communicated to a client device which can display and edit the document contents. A revised version of the JSON object including edits is returned and converted back into an OOXML file. The method allows for preserving document format and other information while avoiding the need for a client device to support display and direct editing of a document in OOXML format.

21 Claims, 16 Drawing Sheets

(51) Int. Cl.
G06F 40/197 (2020.01)
H04W 88/02 (2009.01)

(56) References Cited

U.S. PATENT DOCUMENTS

| | | | |
|---|---|---|---|
| 2011/0138268 A1* | 6/2011 | Zhang | G06F 40/154 |
| | | | 715/239 |
| 2012/0240023 A1* | 9/2012 | Ohguro | G06F 16/958 |
| | | | 715/221 |
| 2016/0171018 A1* | 6/2016 | Baranchenkov | G06F 16/23 |
| | | | 707/803 |

OTHER PUBLICATIONS

Di Iorio et al., A Semantic Web Approach to Everyday Overlapping Markup, ASISnT, 2011, pp. 1696-1716 (Year: 2011).*

* cited by examiner

METHODS AND APPARATUS FOR SUPPORTING THE DISPLAY AND EDITING OF OOXML DOCUMENT CONTENT USING A WEB BROWSER

RELATED APPLICATIONS

The present application claims the benefit of the filing date of U.S. Provisional Application Ser. No. 62/819,512, filed on Mar. 15, 2019, which is hereby expressly incorporated by reference in its entirety.

FIELD

The present application relates to document storage, display and/or editing and, more particularly, to methods and apparatus which allow a device, e.g., to display and edit a document using a Web browser, without having to support direct OOXML format document rendering and editing.

BACKGROUND

The Office OpenXML (OOXML) document format, originally developed by Microsoft, is an open format that represents a word processing document that is typically consumed by a desktop application to allow a user to create, edit, or view a document. In the age of the internet, there has been many attempts to bring this same feature set to the web in a variety of ways.

Unfortunately web pages and web browsers are generally designed to work with web pages which are often in the form of HTML documents rather than OOXML documents. This can make it difficult for OOXML documents to be viewed and edited on a device using a web browser with some system relying on a server to generate in image of the OOXML document, send it to the browser for display and then for edit commands to be sent back to the server with document editing being performed on the server.

Such an approach is sometimes referred to a server side rendering. One approach involves opening an OOXML document server-side using an application specifically designed to read an OOXML document and then sending that data to a client web browser in an image format the browser can handle. In some such implementations the rendered document is sliced into several small images, usually in Portable Network Graphic (PNG) or Joint Photographic Experts Group (JPEG) format. This avoids the need for the browser to handle the OOXML files since the browser simple needs to displaying images which are provided to it, something browsers do very well.

One of the problems with server side rendering is that it is very resource intensive in terms of communications resources. A single page may contain several dozen small images. Each image has to be sent as a network request to the browser. Each image will then have to be stored in the client web browser's cache. If a large document is provided, the number of images to send and store can rise almost exponentially as compared to a small document. This inherently causes several points of failure. For example, if any number of images are not successfully sent due to a poor network connection, for example, gaps may appear in the rendered document. On slower network connections, it can take a very long time to obtain the images need to display a full document as the browser waits for each image to arrive. If the client web browser does not have sufficient memory available to store the full set of images corresponding to a document, gaps may appear in the displayed document.

Another problem is that each time the document is changed, the full set of images that are obsolete have to be resent, downloaded, and displayed in the client web browser.

Server side rending also complicates matters if it is desired to allow a client to interact with or edit the rendered document, as large amounts of data are required to go over a network connection for each change.

Server side rendering has the disadvantage of having to communicate edits to the server where the document editing is performed and then having the server communicate a new image of the edited document back to the device providing the edit commands. Unfortunately such a document processing approach can involve communications delays and impose a relatively significant burden on the amount of data that needs to be communicated back and forth between the server and the device controlling the editing given that images showing the effect of editing need to be communicated from the server back to the device supplying the edit commands.

Notably, documents can be very large, not only in the actual content, but in the supporting metadata that allows the document to be properly displayed for viewing.

In view of the above discussion it should be appreciated that there is a need for methods and/or apparatus that would allow a user to revise a document stored at a server in OOXML format using a browser and have the resulting changes reflected in an OOXML document on the server when the user is done with the revisions. It would be desirable if an approach to document handling could avoid some of the communications and/or memory issues associated with the known approach of receiving images from a server and providing editing instructions back to the server.

SUMMARY

Methods and apparatus for converting an OOXML file into a format which can be rendered, displayed and edited by a browser on a device such as a cell phone without the device having to directly work with the document in the OOXML format are described. In various embodiments the contents of an OOXML file are converted into a JSON object, communicated to a client device which can display and edit the document contents. A revised version of the JSON object including edits is returned and converted back into an OOXML file. The method allows for preserving document format and other information while avoiding the need for a client device to support display and direct editing of a document in OOXML format.

An exemplary method, in accordance with some embodiments, comprises: extracting, at a processing device, e.g., server, one or more XML files and zero or more non-XML files from a first OOXML file representing a first document, said one or more XML files including at least a first XML file; and generating a first file including JSON objects used to represent the first document. An exemplary system, in accordance with some embodiments, comprises: a server including: an interface including a receiver and a transmitter; memory; and a processor configured to: extract one or more XML files and zero or more non-XML files from a first OOXML file representing a first document, said one or more XML files including at least a first XML file; and generate a first file including JSON objects used to represent the first document.

While various embodiments have been discussed in the summary above, it should be appreciated that not necessarily all embodiments include the same features and some of the features described above are not necessary but can be

BRIEF DESCRIPTION OF THE FIGURES

FIG. 2, comprising the combination of FIG. 2A, FIG. 2B, FIG. 2C and FIG. 2D.

DETAILED DESCRIPTION OF THE INVENTION

In various embodiments a lossless or near lossless conversion is performed by a server to convert a OOXML document into a JSON object which can then be communicated to a requesting client device. Small translation layers are used for features the OOXML document that converts the features and content into code an HTML5 browser can display natively. The client can then display and edit the contents of the JSON object. The edited JSON object is returned to the server which then converts the returned JSON object into an OOXML document which can be stored. The OOXML document generated from the returned JSON object in some cases is used to replace the original OOXML document and serves as an edited version of the OOXML document where the edits were made by the client device without the client device having to operate directly on the document in OOXML form.

Figure 1:
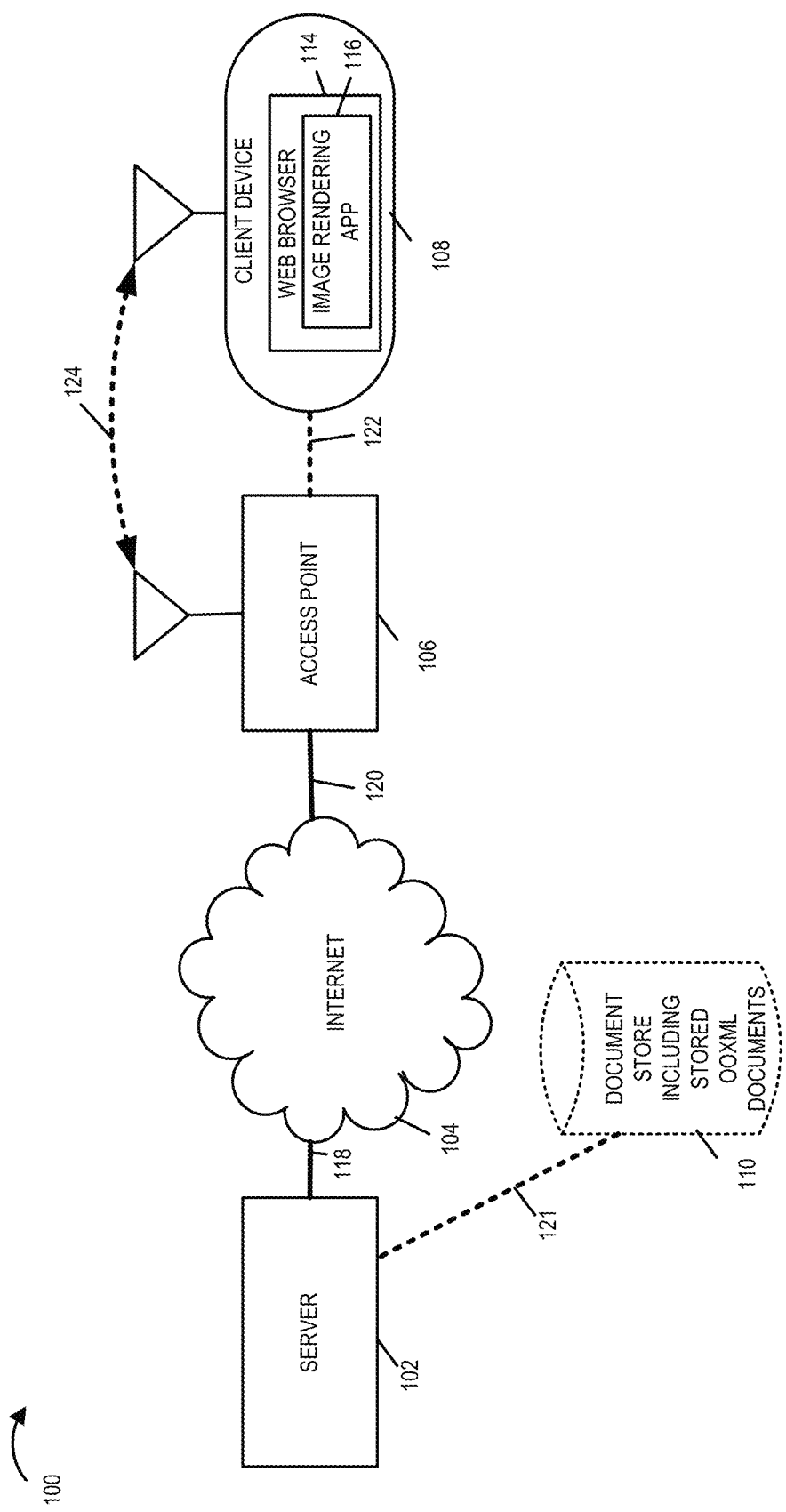
FIG. 1 is a drawing of an exemplary system in accordance with an exemplary embodiment.
Figure 2A:
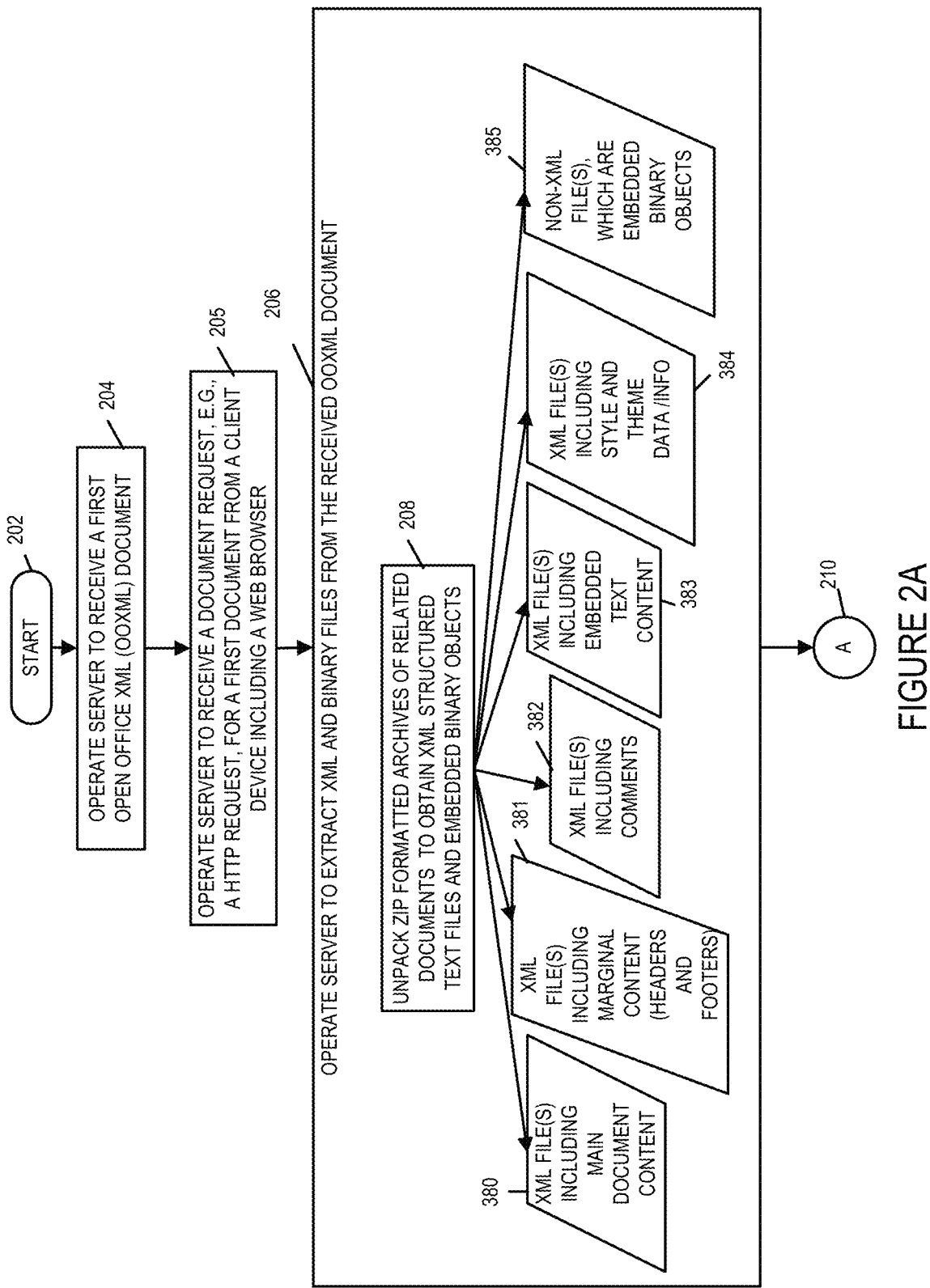
FIG. 2A is first part of a flowchart of an exemplary method in accordance with an exemplary embodiment.
Figure 2B:
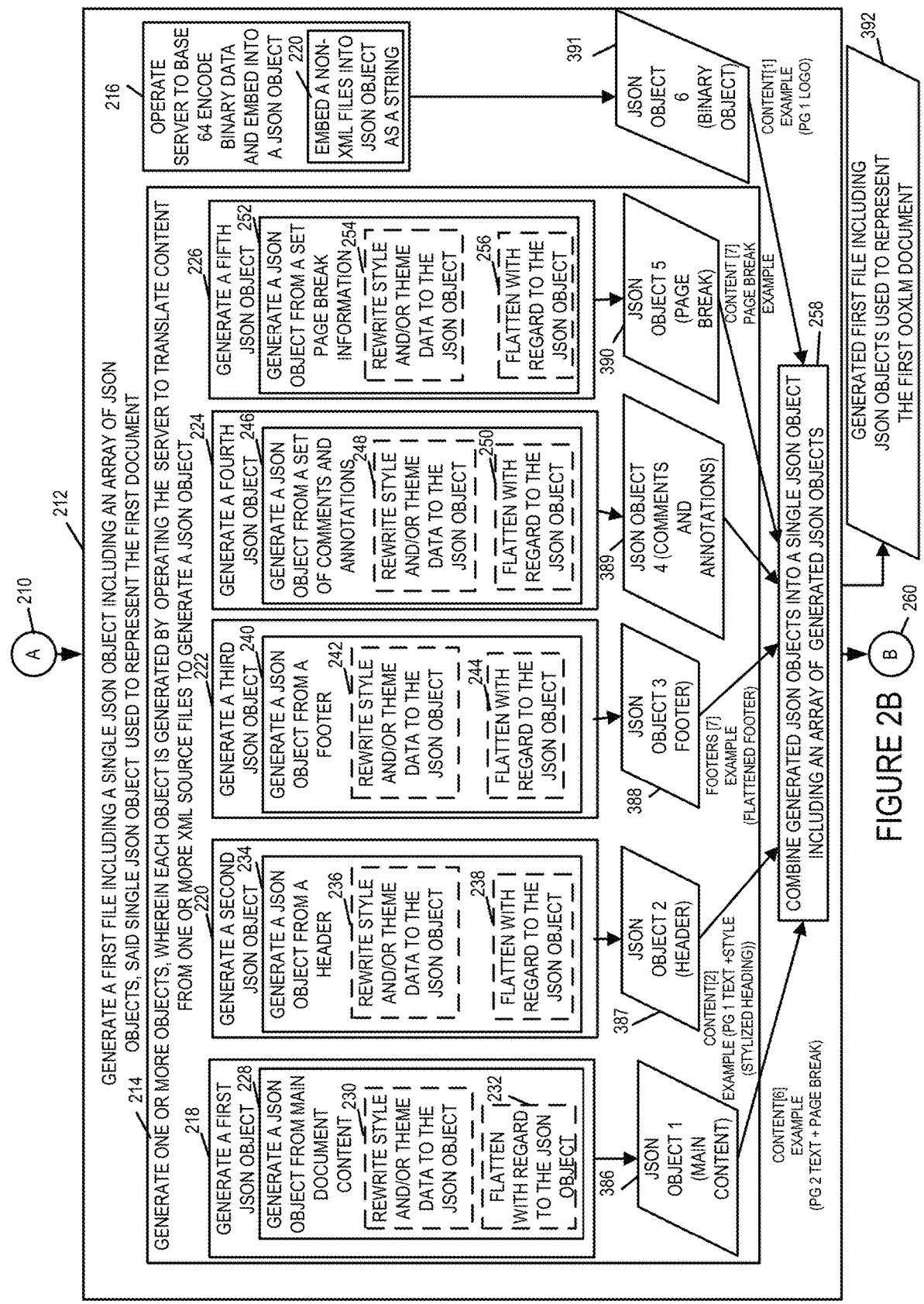
FIG. 2B is second part of a flowchart of an exemplary method in accordance with an exemplary embodiment.
Figure 2C:
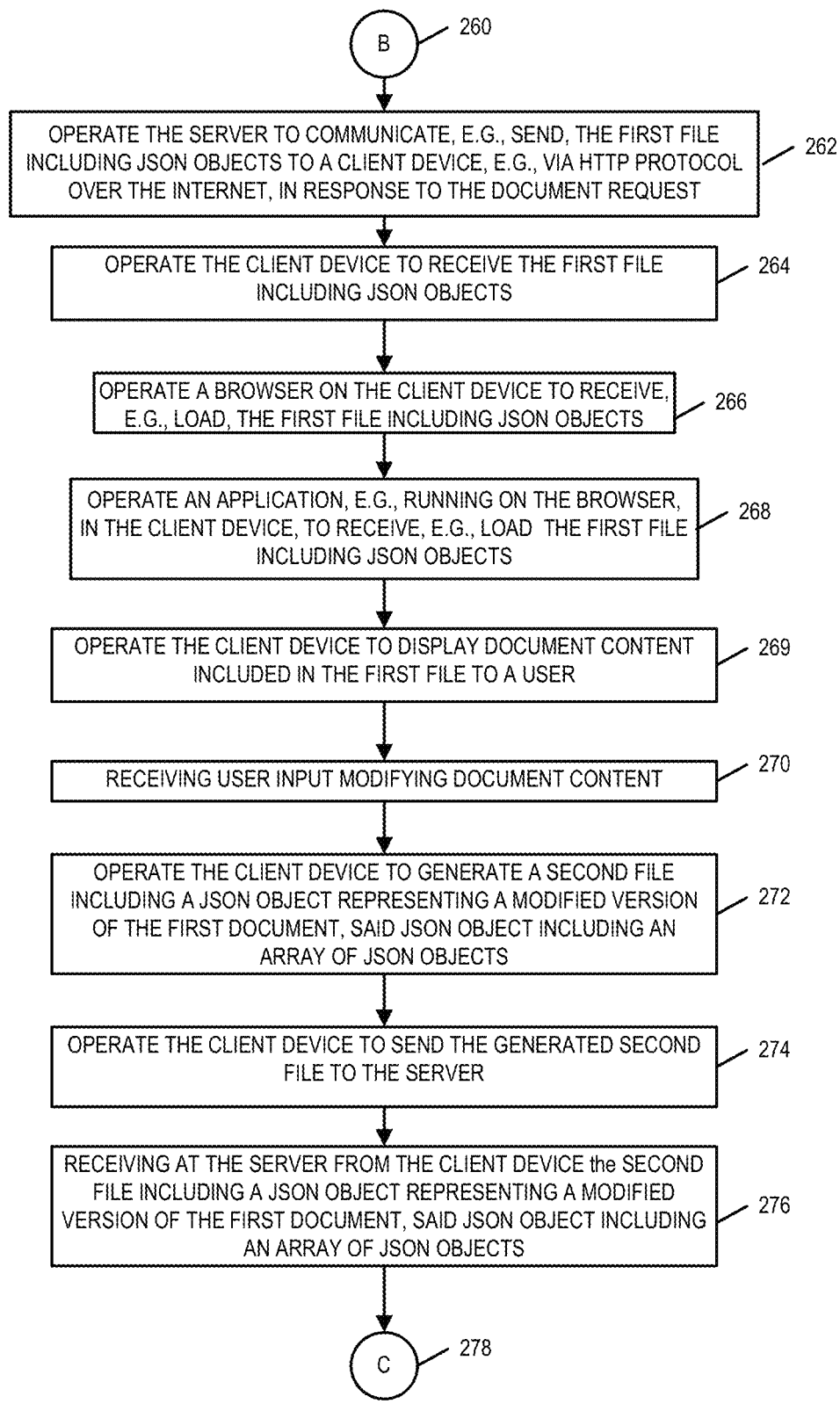
FIG. 2C is first part of a flowchart of an exemplary method in accordance with an exemplary embodiment.
Figure 2D:
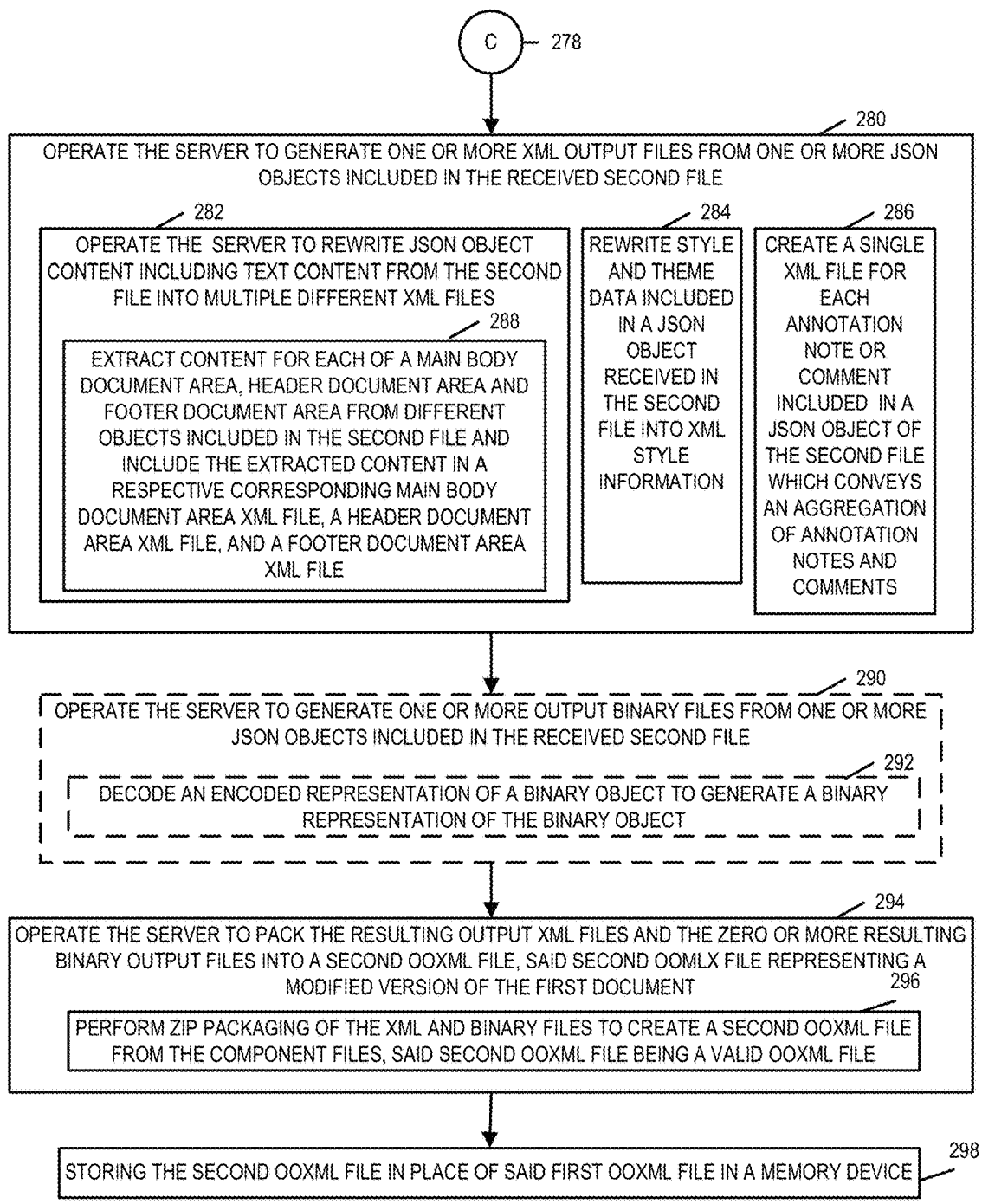
FIG. 2D is fourth part of a flowchart of an exemplary method in accordance with an exemplary embodiment.

FIG. 1 is a drawing of an exemplary system 100 in accordance with an exemplary embodiment. Exemplary system 100 includes a server 102, Internet 104, an access point 106, and a client device 108. The system 100 further includes a document store 110 including stored Open Office XML (OOXML) documents. Server 102 is coupled to the Internet 104 via communications link 118. The Document store 110 is coupled to server 102 via communications link 121. In some embodiments, the document store 110 is included in server 102, as part of the server's memory.

Access point 105, is e.g., a cellular base station, a home or business network local access point, e.g., a WiFi access point, or a local network wired access point, e.g., an Ethernet access point, is coupled to the Internet 104 via communications link 104. The client device 108 is coupled to the access point 106 via wired link 122 and/or via wireless link 124.

Client device 108, e.g., a smart cell phone, a desktop PC, a laptop PC, an electronic notepad, or an electronic tablet, includes a Web browser 114 and an image rendering application (APP) 116, e.g., running on the browser.

The server 102 retrieves a first OOXML document from the document store, and generates a first file including JSON objects, and the generated first file is a representation of the retrieved first OOXML document. The server 102 sends the first file including JSON objects to the client device 108. The client device 108 uses the image rendering application 116 to process the received first file include JSON objects, and displays the rendered image on its display. The client device receives user input, and modifies the first file in response to the user input, e.g., generating a second file including JavaScript Object Notation (JSON) objects.

The client device 108 sends the second file to the server 102, which receives the second file including JSON objects. The server 102 generates a second OOXML document from the second file including JSON objects, said second OOXML document being a modified version of the first OOXML document. The server stores the second OOXML document in the document store 110, e.g., replacing the first OOXML document.

FIG. 2, comprising the combination of FIG. 2A, FIG. 2B, FIG. 2C and FIG. 2D, is a flowchart 200 of an exemplary method in accordance with an exemplary embodiment. The exemplary method of flowchart 200 is, e.g., implemented by the server 102 and client device 108 of system 100 of FIG. 1.

The exemplary method starts in step 202, in which the system, e.g., system 100 of FIG. 1, is powered on and initialized. Operation proceeds from start step 202 to step 204. In step 204, the server, e.g., server 102 of FIG. 1, receives a first open office XML (OOXML) document. Operation proceeds from step 204 to step 205. In step 205 the server receives a document request, e.g., a HTTP request, for a first document from a client device, e.g., client device 108 of FIG. 1, including a web browser. Operation proceeds from step 205 to step 206.

In step 206 the server extracts XML files and binary files from the received OOXML document. Step 206 includes step 208 in which the server unpacks ZIP formatted archives of related documents to obtain XML structured text files and non-XML files, which are embedded binary objects. The obtained XML structured files include XML file(s) 380 including main document content, XML file(s) 381 including marginal content, e.g., headers and footers, XML file(s) 382 including comments, XML file(s) 383 including embedded text content, XML file(s) 384 including style and theme data/information, and non-XML file(s) which are embedded binary objects. Operation proceeds from step 206, via connecting node A 210, to step 212.

In step 212 the server generates a first file including a single JavaScript Object Notation (JSON) object including an array of JSON objects, said single JSON object used to represent the first document. Step 212 includes step 214 and step 216. In step 214 the server generates one or more JSON objects, wherein each object is generated by operating the server to translate content from one or more XML source files to generate a JSON object. Step 214 includes steps 218, 220, 222, 224 and 226.

In step 218 the server generates a first JSON object. Step 218 includes step 228 in which the server generates the first JSON object from main document content, e.g., content from one of XML file(s) 380. Step 228 may, and sometimes does, include one or both of steps 230 and 232. In step 230 the server rewrites style and/or theme data to the first JSON object, e.g., using information obtained from one of XML file(s) 384. In step 232 the server performs flattening with regard to the first JSON object. The result of step 218 is JSON object 1 386, which communicates main content.

In step 220 the server generates a second JSON object. Step 220 includes step 234 in which the server generates the second JSON object from a header, e.g., content from one of XML file(s) 381, which is a header file. Step 234 may, and sometimes does, include one or both of steps 236 and 238. In step 236 the server rewrites style and/or theme data to the second JSON object, e.g., using information obtained from one of XML file(s) 384. In step 238 the server performs flattening with regard to the second JSON object. The result of step 220 is JSON object 2 218, which communicates a header, e.g. a stylized header.

In step 222 the server generates a third JSON object. Step 222 includes step 240 in which the server generates the third JSON object from a footer, e.g., content from one of XML file(s) 381, which is a footer file. Step 240 may, and sometimes does, include one or both of steps 242 and 244. In step 242 the server rewrites style and/or theme data to the third JSON object, e.g., using information obtained from one of XML file(s) 384. In step 244 the server performs flattening with regard to the third JSON object. The result of step 222 is JSON object 3 388, which communicates a footer, e.g., a flattened footer.

In step 224 the server generates a fourth JSON object. Step 224 includes step 246 in which the server generates the fourth JSON object from a set of comments and annotations, e.g., content from one or more of XML file(s) 382, which are files including comments. Step 246 may, and sometimes does, include one or both of steps 248 and 250. In step 248 the server rewrites style and/or theme data to the fourth JSON object, e.g., using information obtained from one or more of XML file(s) 384. In step 250 the server performs flattening with regard to the fourth JSON object. The result of step 224 is JSON object 4 389, which communicates comments and/or annotations.

In step 226 the server generates a fifth JSON object. Step 226 includes step 252 in which the server generates the fifth JSON object from page break information, e.g., page break information from an XML file. Step 226 may, and sometimes does, include one or both of steps 254 and 256. In step 254 the server rewrites style and/or theme data to the fifth JSON object, e.g., using information obtained from one or more of XML file(s) 384. In step 256 the server performs flattening with regard to the fifth JSON object. The result of step 226 is JSON object 5 390, which communicates a page break.

In step 216 the server base 64 encodes a binary data and embeds the encoded binary data into a JSON object. Step 216 includes step 220 in which the server embeds a non-XML file, into a JSON object as a string. The result of step 216 is JSON object 6 389, which communicates a binary object, e.g. an image including a logo.

Operation proceeds from step 214 and step 216 to step 256. In step 256 the server combines generated JSON objects into a single JSON object, and the single JSON object includes an array of generated JSON objects. The output of step 212 is a generated first file 392 including JSON objects, e.g., a single JSON object including a plurality of JSON objects, used to represent the first OOCML document.

Operation proceeds from step 212, via connecting node B 260 to step 262. In step 262 the server communicates, e.g., sends, the first file include JSON objects to the client device, e.g., via HTTP protocol over the Internet, in response to the document request of step 205. Operation proceeds from step 262 to step 264.

In step 264 the client device receives the first file including JSON objects. Operation proceeds from step 264 to step 266. In step 266 the client device operates a browser on the client device to receive, e.g., load, the first file including JSON objects. Operation proceeds from step 266 to step 268. In step 268 the client device operates an application, e.g. running on the browser in the client device, to receive, e.g., load the first file including JSON objects. Operation proceeds from step 268 to step 269.

In step 269 the client device display the document content included in the first file to a user, e.g., the client device uses a renderer, which is configured to process JSON files, to render the received first file including JSON objects and display the document content to the user of the client device, e.g., on the display of the client device. Operation proceeds from step 269 to step 270.

In step 270 the client devices user input, e.g., via an input device of the client device, modifying the document content. Operation proceeds from step 270 to step 272.

In step 272 the client device generates a second file including a JSON object representing a modified version the first document, said JSON object representing a modified version the first document including an array of JSON objects. Operation proceeds from step 272 to step 274.

In step 274 the client device sends the generated second file to the server, e.g., via HTTP protocol over the Internet. Operation proceeds from step 274 to step 276.

In step 276 the server receives from the client device the second file including a JSON object representing a modified version of the first document, said JSON object representing a modified version of the first document including an array of JSON objects. Operation proceeds from step 276, via connecting node C 278, to step 280.

In step 280 the server generates one or more XML output files from one or more JSON objects included in the received second file. Step 280 includes steps 282, 284 and 286. In step 284 the server rewrites JSON object content including text content from the second file into multiple different XML files. Step 282 includes step 288 in which the server extracts content for each of a main body document area, header document area and footer document area from different JSON objects included in second files and includes the extracted content in respective corresponding main body document area XML file, a header document area XML file and a footer document area XML file.

In step 284 the server rewrites style and them data included in a JSON object received in the second file into XML style information. In step 286 the server creates a single XML file for each annotation note or comment included in a SJON object of the second file which conveys an aggregation of annotations notes and comments. In some embodiments, the second file includes one or more JSON objects which represent one or more binary objects, and operation proceeds from step 280 to step 290. In some other embodiments, the second file include a JSON object which represents a binary object, and operation proceeds from step 280 to step 294.

Returning to step 290, in step 290 the server generates one or more output binary files from one or more JSON objects including in the received second file. Step 290 includes step 292, in which the server decodes an encoded representation of a binary object to generate a binary representation of the binary object. Operation proceeds from step 290 to step 294.

In step 294 the server packs the resulting output XML files and the zero or more resulting binary output files into a second OOXML file the second OOXML file representing a modified version of the first document. Step 294 includes step 296, in which the server performs ZIP packaging of the XML and binary files to create a second OOXML file from the component files, said second OOXML file being a valid OOXML file.

Figure 3:
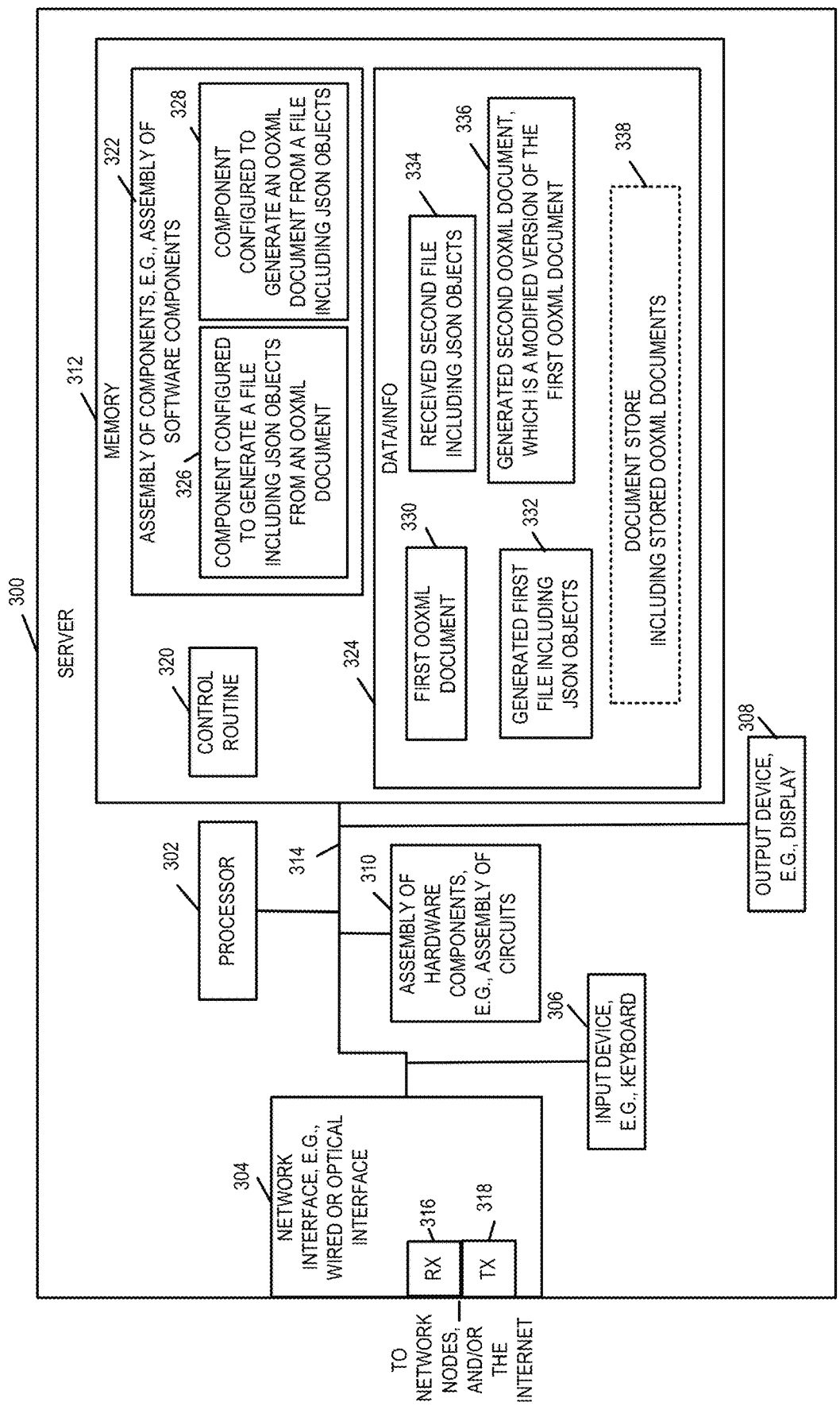
FIG. 3 is a drawing of an exemplary server in accordance with an exemplary embodiment.

FIG. 3 is a drawing of an exemplary server 300 in accordance with an exemplary embodiment. Exemplary server 300 is, e.g., server 102 of FIG. 1. Exemplary server 300, e.g., implements steps of method 200 of FIG. 2, which are performed by a server.

Server 300 includes a processor 302, e.g., a CPU, a network interface 304, e.g., a wired or optical interface, an input device 306, e.g., a keyboard, an output device 308, e.g., a display, an assembly of hardware components 310, e.g., an assembly of circuits, and memory 312, which are coupled together via a bus 314 over which the various elements may interchange data and information. Network device 304 includes receiver 316 and transmitter 318. The receiver 316 and transmitter 318 couples the server 300 to network node, other nodes, and/or the Internet. Exemplary signals received via receiver 316 include a signal communicating a first OOXML document from a document store, which is external to the server 300, a signal communicating a second file including JSON objects from a client device. Exemplary signals transmitted via transmitter 318 include a signal communicating a first file including JSON objects to a client device, and a signal communicating a second OOXML document from to document store, which is external to the server 300.

Memory 312 includes a control routine 320, an assembly of components 322, e.g., an assembly of software components, and data/information 324. Assembly of components 322 includes a component configured to generate a file including JSON objects from an OOXML document, and a component 328 configured to generate an OOXML document from a file including JSON objects. Data/information 324 includes a first OOXML document 330, a generated file including JSON objects 332, a received second file including JSON objects 334, and a generated second OOXML document, which is a modified version of the first OOXML document. In some embodiment, data/information 324 further includes a document store 338 including stored OOXML documents.

Figure 4:
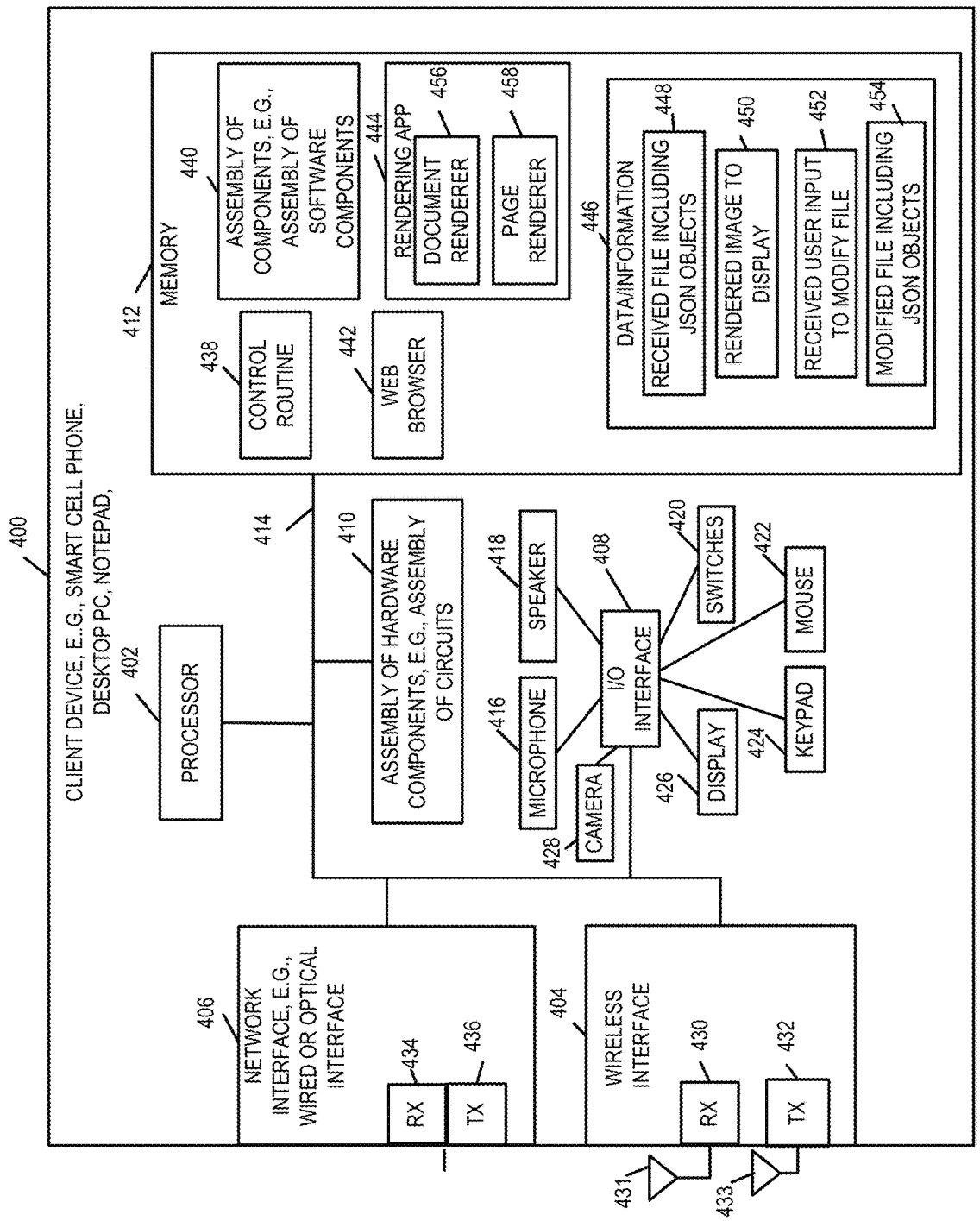
FIG. 4 is a drawing of an exemplary client device in accordance with an exemplary embodiment.

FIG. 4 is a drawing of an exemplary client device 400 in accordance with an exemplary embodiment. Exemplary client device 400 is, e.g., client device 108 of FIG. 1. Exemplary client device 400 is, e.g., client device 108 of FIG. 1. Client device 400, e.g., implements steps of method 200 of FIG. 2, which are performed by a client device.

Client device 400 includes a processor 402, e.g., a CPU, a wireless interface 404, a network interface 406, e.g., a wired or optical interface, an input/output (I/O) interface 408, an assembly of hardware components 410, e.g., an assembly of circuits, and memory 412, which are coupled together via a bus 414 over which the various elements may interchange data and information. Client device 400 further includes a microphone 416, a speaker 418, switches 420, a mouse 422, a keypad 424, a display 426 and a camera 428, which are coupled to I/O interface 408 which couples the various I/O devices to other elements within the client device 400. In some embodiments display 426 is a touch screen display which servers as both an input and output device.

Wireless interface 404 includes a wireless receiver 430, coupled to receive antenna 431, via which the client device 400 receives wireless signals. Wireless interface 404 further includes a wireless transmitter 432, coupled to transmit antenna 433, via which the client device transmits wireless signal. In some embodiments, the same antenna is used for transmit and receive. In some embodiments multiple antennas are used for transmit and/or receive. Network interface 406 includes a receiver 434 and a transmitter 436. Network interface 406 couples the client device 400 to an access point, e.g., access point 106, via a wired or optical link. Exemplary signals received via receiver 434 or 430 include signals communicating a first file including JSON objects, said first file being a JSON representation of a first OOXML file, said first file having been sent from the server. Exemplary signals transmitted via transmitter 436 or transmitter 432 include signals being sent to a server communicating a document request, and signals communicating a second file including JSON objects, said second file being a modified version of the first file, e.g., based on user input, said second file being sent to the server.

Memory 412 includes a control routine 438, an assembly of components 440, e.g., an assembly of software components, a web browser 442, a rendering application 444, and data/information 446. Rendering application (APP) 444 includes a document renderer 456 and a page renderer 458. In some embodiment, the document renderer implements the method of flowchart 800 of FIG. 8 and the page renderer 458 implements the method of flowchart 900 of FIG. 9. Data/information 446 includes a received file including JSON objects 448, e.g., a first file including JSON objects, a rendered image to display 450, received user input to modify a file 452, and a modified file including JSON objects 454, e.g., a second file including JSON objects.

Figure 5A:
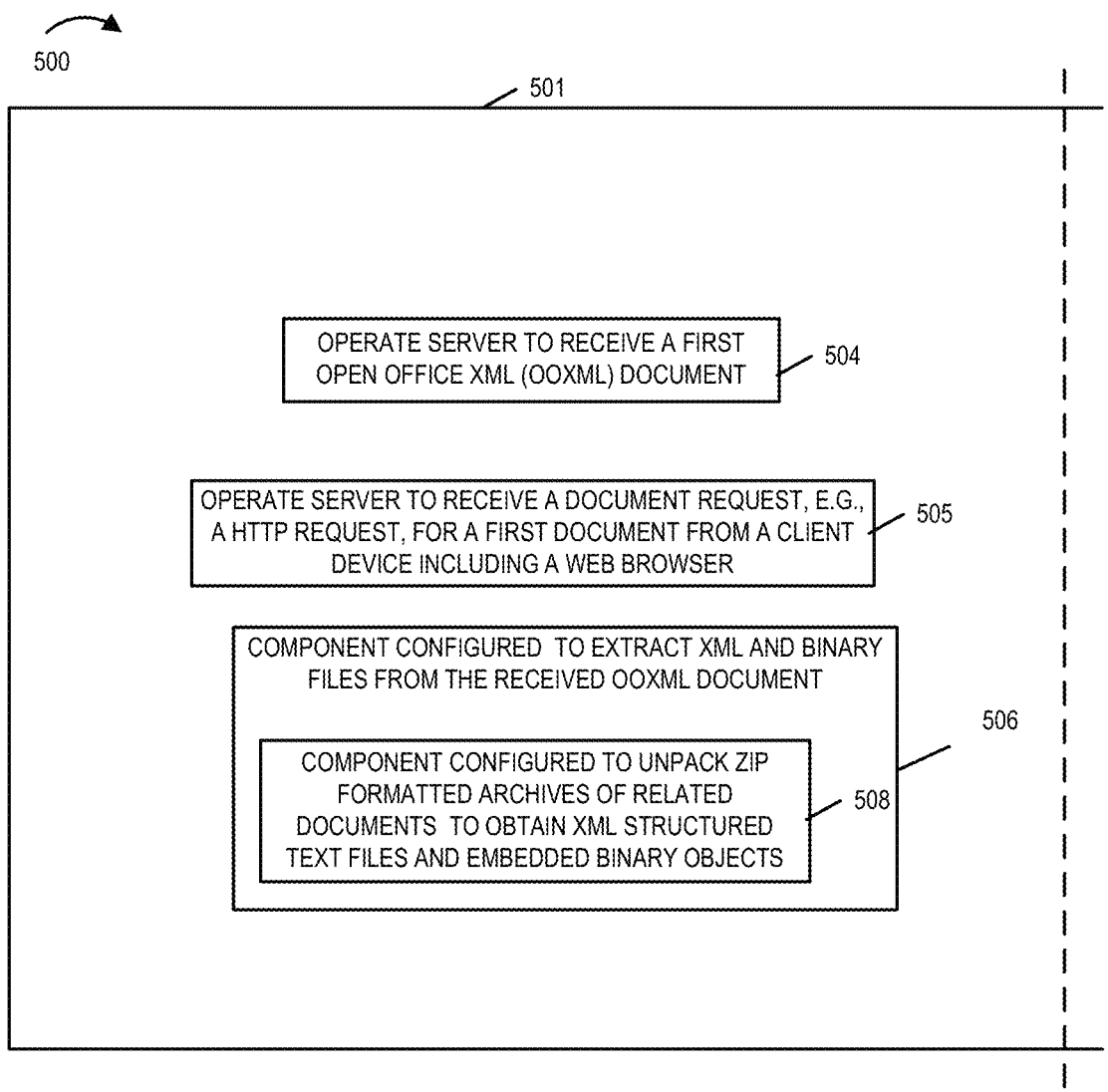
FIG. 5A is a drawing of a first part of an exemplary assembly of components which may be included in a server implemented in accordance with an exemplary embodiment.
Figure 5B:
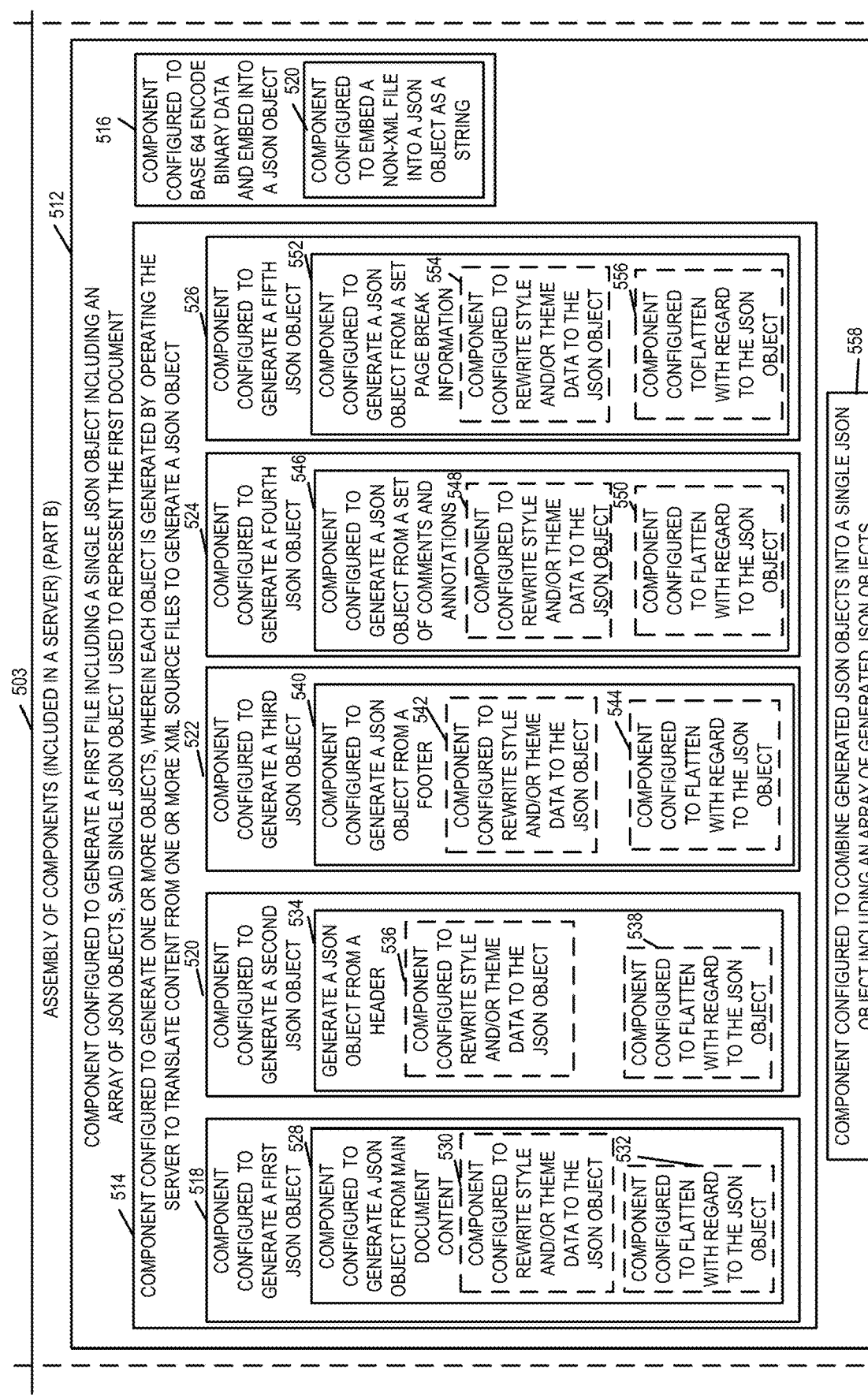
FIG. 5B is a drawing of a second part of an exemplary assembly of components which may be included in a server implemented in accordance with an exemplary embodiment.
Figures 5, 5C:
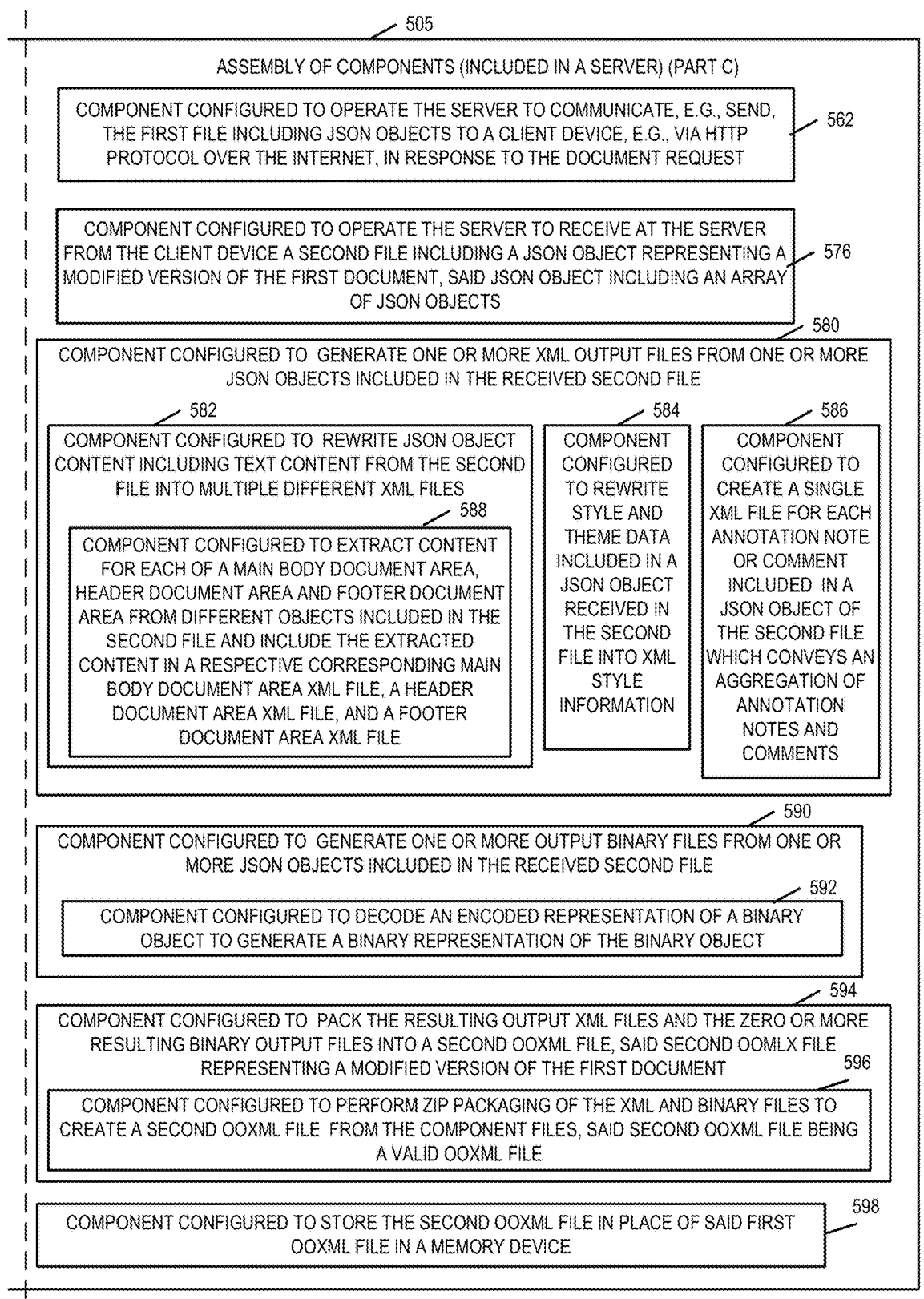
FIG. 5C is a drawing of a third part of an exemplary assembly of components which may be included in a server implemented in accordance with an exemplary embodiment.
FIG. 5 comprises the combination of FIG. 5A, FIG. 5B and FIG. 5C.

FIG. 5, comprising the combination of FIG. 5A, FIG. 5B and FIG. 5C, is a drawing of an exemplary assembly of components 500, comprising the combination of Part A 501, Part B 503, Part C 505, which may be included in a server implemented in accordance with an exemplary embodiment.

Exemplary assembly of components 500 may be included in a server, such as the exemplary server 102 of FIG. 1 and/or exemplary server 300 of FIG. 3, and implement steps of an exemplary method, e.g., steps of the method of the flowchart 200 of FIG. 2 which are performed by the client device.

Assembly of components 500 can be, and in some embodiments is, used in server 102 of FIG. 1 and/or server 300 of FIG. 3. The components in the assembly of components 600 can, and in some embodiments are, implemented fully in hardware within the processor 302, e.g., as individual circuits. The components in the assembly of components 500 can, and in some embodiments are, implemented fully in hardware within the assembly of components 310, e.g., as individual circuits corresponding to the different components. In other embodiments some of the components are implemented, e.g., as circuits, within the processor 302 with other components being implemented, e.g., as circuits within assembly of components 310, external to and coupled to the processor 302. As should be appreciated the level of integration of components on the processor and/or with some components being external to the processor may be one of design choice. Alternatively, rather than being implemented as circuits, all or some of the components may be implemented in software and stored in the memory 312 of the server 300, with the components controlling operation of the server to implement the functions corresponding to the components when the components are executed by a processor, e.g., processor 302. In some such embodiments, the assembly of components 500 is included in the memory 312 as assembly of components 322 or included in assembly of components 322. In still other embodiments, various components in assembly of components 500 are implemented as a combination of hardware and software, e.g., with another circuit external to the processor 302 providing input to the processor 302 which then under software control operates to perform a portion of a component's function. While processor 302 is shown in the FIG. 3 embodiment as a single processor, e.g., computer, it should be appreciated that the processor 302 may be implemented as one or more processors, e.g., computers.

When implemented in software the components include code, which when executed by the processor 302, configure the processor 302 to implement the function corresponding to the component. In embodiments where the assembly of components 500 is stored in the memory 512, the memory 512 is a computer program product comprising a computer readable medium comprising code, e.g., individual code for each component, for causing at least one computer, e.g., processor 302, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 5 control and/or configure the server 300, or elements therein such as the processor 302, to perform the functions of corresponding steps illustrated and/or described in the method of one or more of the flowcharts, signaling diagrams and/or described with respect to any of the Figures. Thus the assembly of components 500 includes various components that perform functions of corresponding one or more described and/or illustrated steps of an exemplary method, e.g., steps of the method of flowchart 200 of FIG. 2, which are performed by the server, and/or described or shown with respect to any of the other figures.

Assembly of components 500 includes a component 504 configured to operate the server to receive a first open office XML (OOXML) document, a component 505 configured to operate the server to receive a document request, e.g., a HTTP request, for a first document from a client device including a web browser, and a component 506 configured to extract XML and binary files from the received OOXML document 506. Component 506 includes a component 508 configured to unpack ZIP formatted archives of related documents to obtain XML structured text files and embedded binary objects.

Assembly of components 500 further includes a component 512 configured to generate a first file including a single JSON object including an array of JSON objects, said single JSON object used to represent the first document. Component 512 includes a component 514 configured to generate one or more JSON objects, wherein each JSON object is generated by operating the server to translate content form one or more XML source files to generate a JSON object, and a component 516 configured to base 64 encode binary data, e.g. representing a binary object, and embed the encoded binary data into a JSON object. Component 516 includes a component 520 configured to embed the non-XML file into a JSON object as a string.

Component 514 includes a component 518 configured to generate a first JSON object. Component 518 includes a component 528 configured to generate the first JSON object from main document content. In some embodiments, component 528 includes one or both of a component 530 configured to rewrite style and/or theme data to the first JSON object, and a component 532 configured to flatten with regard to the first JSON object.

Component 514 further includes a component 520 configured to generate a second JSON object. Component 520 includes a component 534 configured to generate the second JSON object from a header. In some embodiments, component 534 includes one or both of a component 536 configured to rewrite style and/or theme data to the second JSON object, and a component 538 configured to flatten with regard to the second JSON object.

Component 514 further includes a component 522 configured to generate a third JSON object. Component 522 includes a component 540 configured to generate the third JSON object from a footer. In some embodiments, component 540 includes one or both of a component 542 configured to rewrite style and/or theme data to the third JSON object, and a component 544 configured to flatten with regard to the third JSON object.

Component 514 further includes a component 524 configured to generate a fourth JSON object. Component 524 includes a component 546 configured to generate the fourth JSON object from a set of comments and/or annotations. In some embodiments, component 546 includes one or both of a component 548 configured to rewrite style and/or theme data to the fourth JSON object, and a component 550 configured to flatten with regard to the fourth JSON object.

Component 514 further includes a component 526 configured to generate a fifth JSON object. Component 526 includes a component 552 configured to generate the fifth JSON object from a set of page break information. In some embodiments, component 552 includes one or both of a component 554 configured to rewrite style and/or theme data to the fifth JSON object, and a component 556 configured to flatten with regard to the fifth JSON object.

Assembly of components 500 further includes a component 562 configured to operate the server to communicate, e.g., send, the first file including JSON objects to a client device, e.g., via HTTP protocol over the Internet, in response to the document request, and a component 576 configured to operate the server to receive at the server from the client device a second file including a JSON object representing a modified version of the first document, said JSON object representing a modified version of the first document including an array of JSON objects.

Assembly of components 500 further includes a component 580 configured to generate one or more XML output files from one or more JSON objects included in the received second file. Component 580 includes a component 582 configured to rewrite JSON object content including text content from the second file into multiple different XML files. Component 582 includes a component 588 configured to extract content for each of a main body document area, header document area and footer document area from different JSON objects included in the second file and include the extracted content in a respective corresponding main body document area XML file, a header document are XML file, and a footer document area XML file. Component 580 further includes a component 584 configured to rewrite style and theme data included in a JSON object received in the second file into a style and theme data information XML file. Component 580 further includes a component 586 configured to create a single XML file for each annotation node or comment included in a SON object of the second files which conveys an aggregation of annotation notes and comments.

Assembly of components 500 further includes a component 590 configured to generate one or more output binary files from one or more JSON objects included in the received second file. Component 590 includes a component 592 configured to decode an embedded representation of a binary object, e.g., an embedded encoded, e.g., using base 64 encoding, representation of the binary object communicated in a string of the binary object, to generate a binary representation of the binary object.

Assembly of components 500 further includes a component 594 configured to pack the resulting XML files and the zero or more resulting binary files into a second OOXML file, said second OOXML file representing a modified version of the first document. Component 594 includes a component 596 configured to perform ZIP packaging of the XML and binary files to create a second OOXML file from the component files, said second OOXML file being a valid OOXML file.

Assembly of components 500 further includes a component 598 configured to store the second OOXML file in place of said first OOXML file in a memory device, e.g., document store 110 external to the server or document store 338 in the server.

Figure 6:
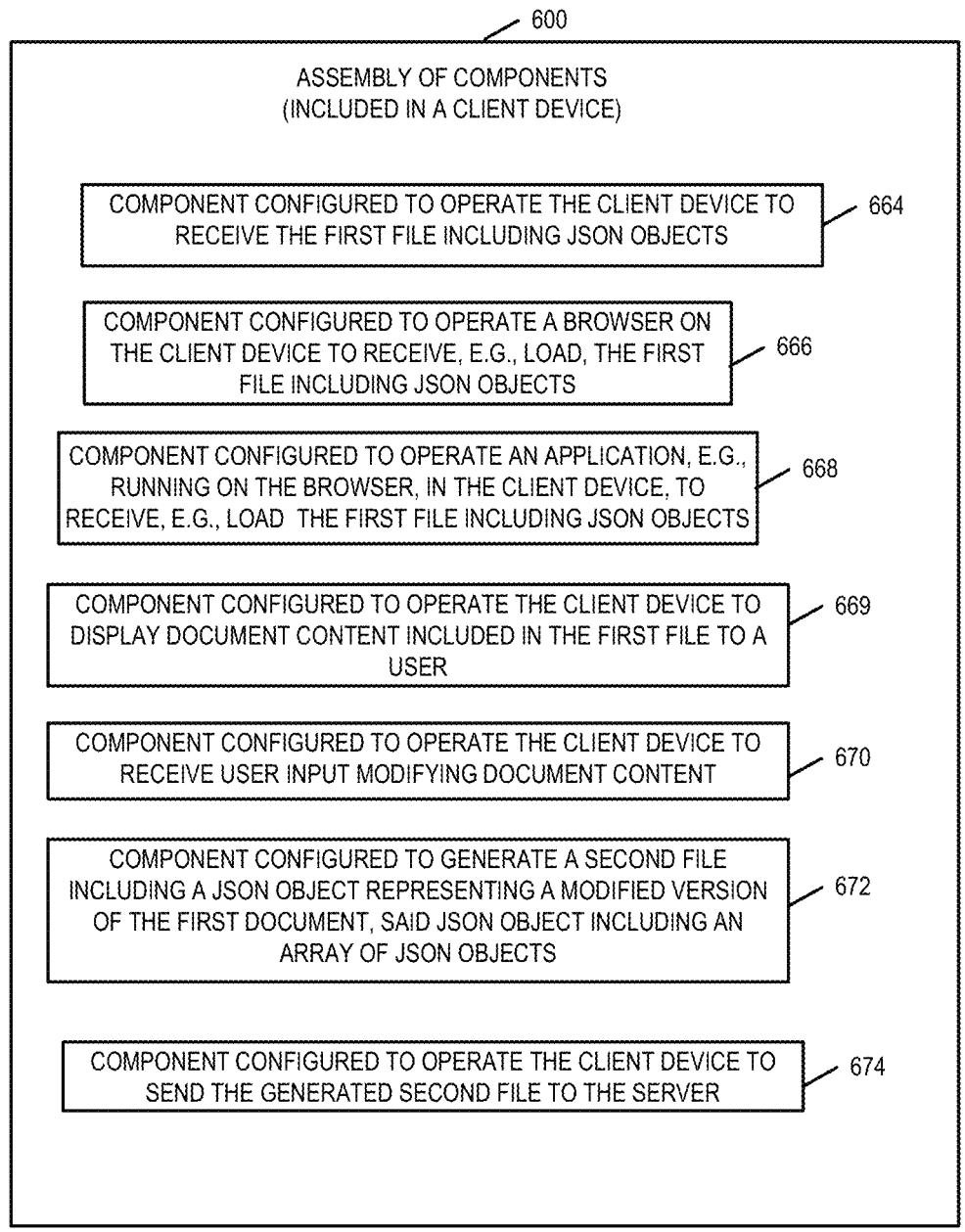
FIG. 6 is a drawing of an exemplary assembly of components which may be included in a client device implemented in accordance with an exemplary embodiment.

FIG. 6 is a drawing of an exemplary assembly of components 600 which may be included in a client device implemented in accordance with an exemplary embodiment.

Exemplary assembly of components 600 may be included in a client device, such as the exemplary client device 108 of FIG. 1 and/or exemplary client device 400 of FIG. 4, and implement steps of an exemplary method, e.g., steps of the method of the flowchart 200 of FIG. 2 which are performed by the client device.

Assembly of components 600 can be, and in some embodiments is, used in client device 108 of FIG. 1 and/or client device 400 of FIG. 4. The components in the assembly of components 600 can, and in some embodiments are, implemented fully in hardware within the processor 402, e.g., as individual circuits. The components in the assembly of components 600 can, and in some embodiments are, implemented fully in hardware within the assembly of components 410, e.g., as individual circuits corresponding to the different components. In other embodiments some of the components are implemented, e.g., as circuits, within the processor 402 with other components being implemented, e.g., as circuits within assembly of components 410, external to and coupled to the processor 402. As should be appreciated the level of integration of components on the processor and/or with some components being external to the processor may be one of design choice. Alternatively, rather than being implemented as circuits, all or some of the components may be implemented in software and stored in the memory 412 of the client device 400, with the components controlling operation of the client device to implement the functions corresponding to the components when the components are executed by a processor, e.g., processor 402. In some such embodiments, the assembly of components 600 is included in the memory 412 as assembly of components 440. In still other embodiments, various components in assembly of components 600 are implemented as a combination of hardware and software, e.g., with another circuit external to the processor 402 providing input to the processor 402 which then under software control operates to perform a portion of a component's function. While processor 402 is shown in the FIG. 4 embodiment as a single processor, e.g., computer, it should be appreciated that the processor 402 may be implemented as one or more processors, e.g., computers.

When implemented in software the components include code, which when executed by the processor 402, configure the processor 402 to implement the function corresponding to the component. In embodiments where the assembly of components 600 is stored in the memory 412, the memory 412 is a computer program product comprising a computer readable medium comprising code, e.g., individual code for each component, for causing at least one computer, e.g., processor 402, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 6 control and/or configure the client device 400, or elements therein such as the processor 402, to perform the functions of corresponding steps illustrated and/or described in the method of one or more of the flowcharts, signaling diagrams and/or described with respect to any of the Figures. Thus the assembly of components 600 includes various components that perform functions of corresponding one or more described and/or illustrated steps of an exemplary method, e.g., steps of the method of flowchart 200 of FIG. 2, which are performed by the client device, and/or described or shown with respect to any of the other figures.

Assembly of components 600 includes a component 664 configured to operate the client device to receive a first file including JSON objects, a component 666 configured to operate a browser on the client device to receive, e.g., load, the first file include JSON objects, a component 668 configured to operate an application, e.g., an application running on the browser of the client device to receive, e.g., load, the first file include JSON objects or at least portions of the first file including JSON objects. Assembly of components 600 further includes a component 669 configured to operate the client device to display document content including in the first file to a user, e.g., configured to operate a rendering app on the client device to render an image using the first file including JSON objects as input, and to output the rendered image to a display of the client device to display to the user of the client device.

Assembly of components 600 further includes a component 670 configured to operate the client device to receive user input modifying document content, a component 672 configured to generate a second file including JSON object representing a modified version of the first document, JSON object representing a modified version of the first document including an array of JSON objects. Assembly of components 600 further includes a component 674 configured to operate the client device to send, e.g., via HTTP protocol over the Internet, the generated second file to the server.

Figure 7:
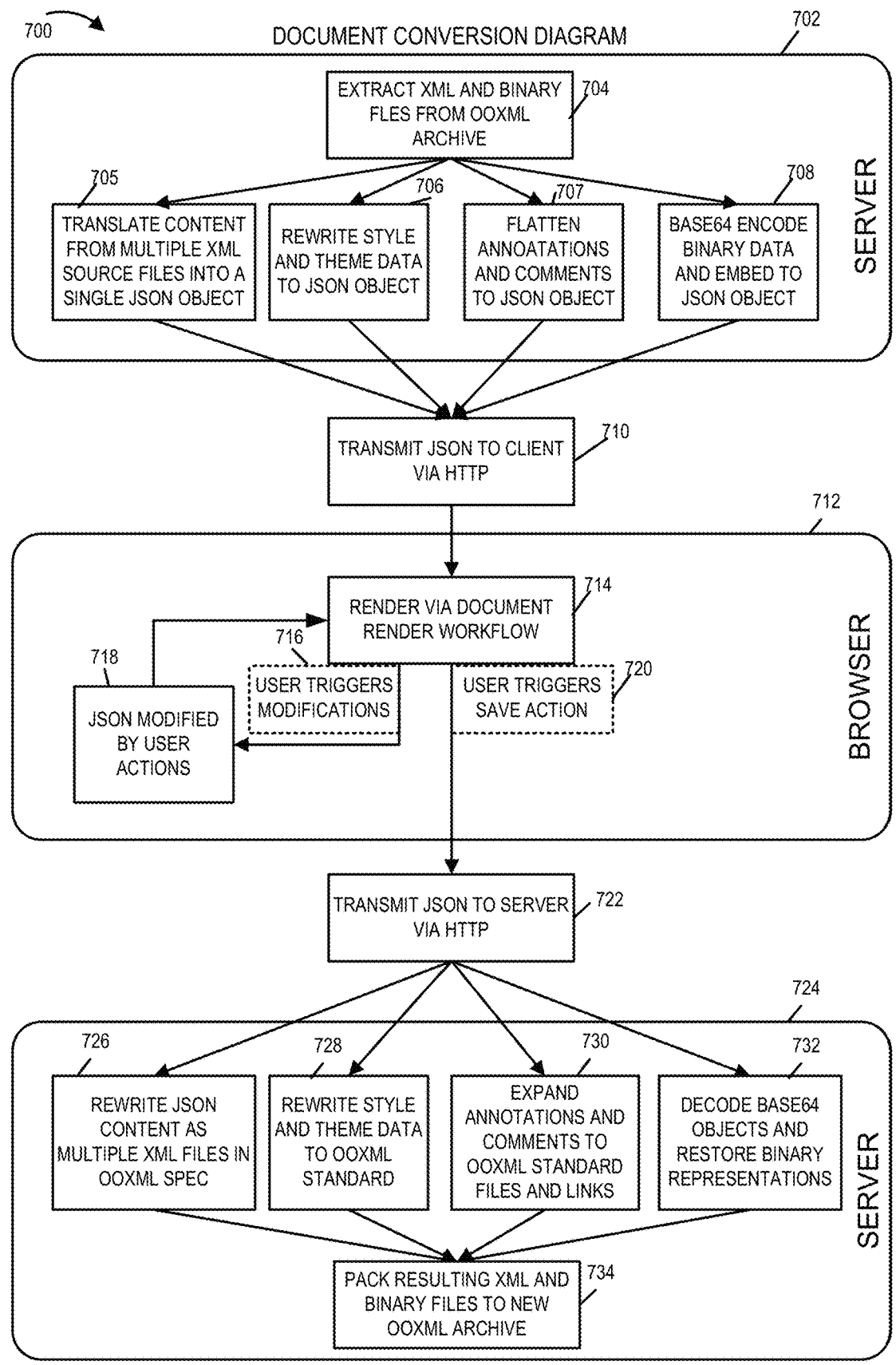
FIG. 7 is a diagram illustrating an exemplary OOXML document conversion to JSON performed by a server, transmission of the JSON from the server to a client device including a browser via HTTP, JSON modification by the client in response to user input, transmission of the JSON from the client device to the server via HTTP, and conversion from JSON to COWL by the server, resulting in an OOXML document, said resulting OOXML document being a modified version of the initial OOXML document, in accordance with an exemplary embodiment.

FIG. 7 is a diagram 700 illustrating an exemplary OOXML document conversion to JSON performed by a server, transmission of the JSON from the server to a client device including a browser via HTTP, JSON modification by the client in response to user input, transmission of the JSON from the client device to the server via HTTP, and conversion from JSON to OOXML by the server, resulting in an OOXML document, said resulting OOXML document being a modified version of the initial OOXML document, in accordance with an exemplary embodiment.

Block 702 illustrates exemplary steps 704, 705, 706, 707 and 708, which are performed by a server, e.g., server 102 of FIG. 1 or server 300 of FIG. 3, regarding conversion of an OOXML document to JSON. In step 704 the server extracts XML and binary files from an OOXML archive. The open OOXML format is a ZIP archive of related documents, all of which are either XML structured text files, or an embedded binary object. Using software for the unpacking of ZIP formatted archives, e.g., existing software, the process of step 704 will extract the component files from the OOXML document in preparation for the conversion. Operation proceeds from step 704 to steps 705, 706, 707 and 708.

In step 705 the server translates content from multiple XML source files into a single JSON object. Main document content, marginal content (headers and footers), comments, and embedded text content are originally stored in individual XML files post-extraction. Step 705 will add each of these elements to a structured tree in a single JSON-formatted object.

In step 706, the server rewrites style and theme data to JSON object. Style and theme information is stored in XML files with references from the various content sections via .xml.rel files (standard XML files providing relationship metadata between other files). During the conversion process, in step 706 this style and/or theme data is associated with the pieces of content that use that style or theme so that it can be directly accessed during rendering.

In step 707 the server flattens annotations and comments to JSON object. In step 707 each annotation note or comment entity in the document is stored in a separate XML file in the archive. During conversion, these are converted to a single array of annotations and a single array of comments and appended to the main document source object in the JSON file.

In step 708 the server base64 encodes binary data and embeds to JSON object. In step 708 each of the extracted files that are not XML based are encoded in base64 and embedded into the JSON object as a string. The content-type of each file is pulled from the .xml.rel file pertaining to the binary object and prepended to the string in order to allow it to be rendered (if applicable) directly in the HTML-compliant browser. Operation proceeds from steps 705, 706, 707 and 708 to step 710.

In step 710 the JSON object is transmitted from the server to the client device, e.g., client device 108 of FIG. 1 or client device 400 of FIG. 4, via HTTP. In step 710, with the document fully converted to a single JSON object, it is sent as the body of a standard HTTP response to a client browser that has requested the contents of the specific document.

Block 712 illustrates exemplary steps 714, 716, 718 and 720, which are performed by a client device, e.g., in the web browser of the client device. In step 714 the client device uses the received JSON object as input and performs rendering, e.g., via the document rendering workflow of FIGS. 8 and 9. In step 714, the document renderer process (outlined in detail separately see FIGS. 8 and 9) is used to generate the standards-compliant HTML output. Modifications made to the document content in the browser may trigger this rendering operation numerous times in order to update the display.

Operation proceeds from step 714 to step 716 or step 720. In step 716 a user, e.g., received user input, triggers modifications. Operation proceeds from step 716 to step 718. In step 718 the client device modifies the JSON in response to received user actions, e.g., in response to received user input modifications. In step 718 the client application makes modifications to the JSON object in response to user actions within the interface. These changes modify the working copy of the object, which acts as the source content for both the rendering and any future saving. Operation proceeds from step 718 to step 714, in which the client device uses the modified JSON as input and performs rendering.

Returning to step 720, in step 720 the user triggers a save action, e.g., the client device receives user input indicating the user desires to save the modified document. Operation proceeds from step 720 to step 722.

In step 722 the client device transmits the JSON to the server via HTTP. In step 722, with the document fully converted to a single JSON object, it is sent as the body of a standard HTTP response to a client browser that has requested the contents of the specific document. The transmitted JSON is a modified version of the received JSON, if at least one iteration of step 718 was performed.

Block 724 illustrates exemplary steps 726, 728, 730, 732 and 734, are performed by the server, to convert the received JSON to an OOXML document. Operation proceeds from step 722 to steps 726, 728, 730 and 732.

In step 726 the server rewrites JSON content as multiple XML files in OOXML spec. In step 726 the server extracts the content for each content area from the JSON tree (main body, headers, footers) and recreate the standard XML representations of those entities.

In step 728 the server rewrites style and theme data to OOXML standard. In step 728 the server regenerates the style and theme data based on the inlined styles extracted from the JSON content elements and creates the XML files for the OOXML representation of those styles.

In step 730 the server expands annotations and comments to OOXML standard files and links. In step 730 for each annotation node or comment in the JSON tree, the server recreates a single XML file for the content and the relationship reference in the base XML structures.

In step 732 the server decodes base64 objects and restores binary representations. IN step 732 for each encoded binary file in the JSON tree, the server decodes the string representation into an individual binary file and recreates the relationship reference in the base XML structures.

Operation proceeds from steps 726, 728, 730 and 732 to step 734. In step 734 the server packs the resulting XML files and binary files to new OOXML archive. In step 734 using existing software for the packaging of ZIP formatted archives, the server will recreate a valid OOXML archive from the component files, both XML content and recreated binary data, with each of the relationships intact.

Various features and/or aspects of the document conversion steps of drawing 700 of FIG. 7 are described further below.

In some embodiments the process of invention involves converting, at a server, an OOXML file, which may be, and sometimes is, a zip archive of multiple XML files and embedded binary content, into a single JSON object. The JSON object is then communicated to a client device, e.g., a device running a Web browser. The communication between the client device seeking to access and/or edit a document and the server which supplies the JSON object in response to a document request maybe and sometimes is performed over the Internet or another network. The JSON object representing the document which is displayed and edited using the browser running on the client device without the need to communicate edit instructions or receive images from the server in response to edits as is often the case when server side rendering is used.

The JSON object resulting from the editing is communicated back to the server and the server converts the received JSON object into a valid OOXML document. Initial server conversion from the OOXML format to the JSON object and then the conversion of the JSON object back to OOXML is lossless or nearly loss less with document fonts and formatting normally being preserved.

In this way a client device need not operate directly on the OOXML document but the document formatting and other information can be preserved in a manner that is consistent with the original source document. Given that the final edited document is stored in OOXML form, e.g., on the server, potentially in place of the original OOXML document the method can be used as a way to edit an OOXML document without requiring a browser to support OOXML.

A document may, and sometimes does, include various portions including a main document portion, supplementary document parts, binary data, as well as one or more other document parts.

The main document content from the OOXML document requested by a client device is converted in the server from XML to JSON and rewritten to reduce complexity of the document by targeting a single expected output for each structure or element in the document.

Upon a server converting, e.g., writing, the content of a returned JSON object back to OOXML, the content will potentially be structurally changed to the expected structure of the latest version of OOXML, but the visual content will remain unchanged.

In various embodiments Supplementary Document Parts such as visual styles, numbering and list styles, footnotes, endnotes, headers, footers, and themes are all pulled from their specific XML files of the OOXML bundle that forms an OOXML document. The supplementary document parts are then stored as flattened top level objects in the resulting JSON object that is generated to be sent to the client device. This allows the single JSON object, which in some embodiments is an array of JSON objects, to associate data that is used for rendering the content at runtime with objects in the array. The mapping of this data is non-destructive and can be fully reversed upon export, e.g., conversion, of a returned document back to OOXML.

Any non-XML data in the document, including binary data such as embedded images and fonts, can be and sometimes is preserved in the JSON object generated by the server for communication to the client. In some embodiments such binary data is represented as base-64 encoded text with the content-type pulled from the OOXML metadata and prepended to the encoded text incorporated into the JSON file being created. These strings are treated as immutable by the client device and can be removed, but not altered. In some embodiments the binary data can represent logos or other document elements which are to be communicated as binary data, e.g., representing images. Upon export, the strings or the returned JSON object are written back to binary files and the content-type associations recreated for the OOXML document.

Figure 8:
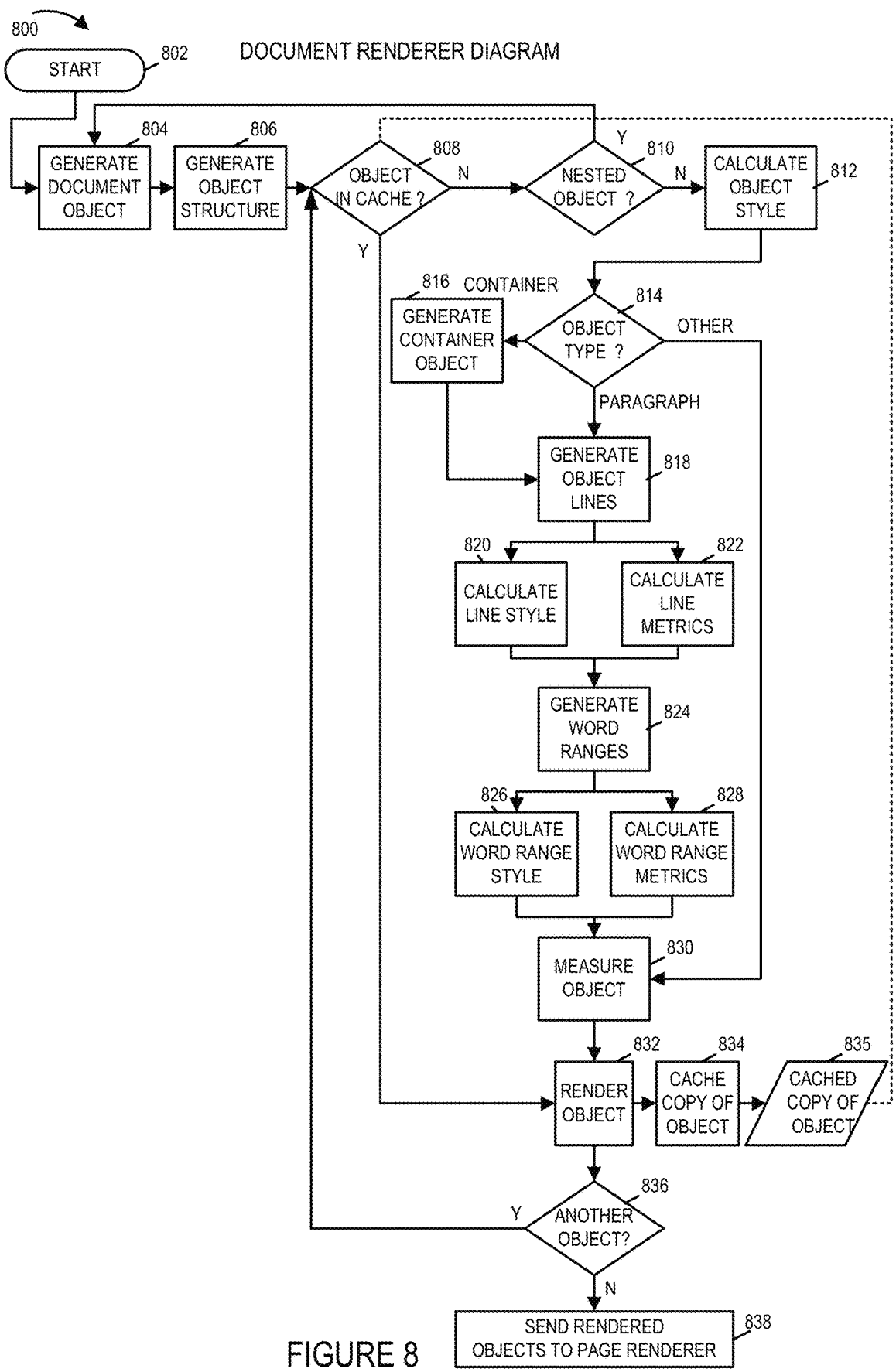
FIG. 8 is a drawing of a flowchart illustrating an exemplary method of document rendering in accordance with an exemplary embodiment.

FIG. 8 is a drawing of a flowchart 800 illustrating an exemplary method of document rendering in accordance with an exemplary embodiment. The exemplary method of flowchart 800 is, e.g., performed by a document renderer, e.g., document renderer 456, included in client device 400 of FIG. 4 or client device 108 of FIG. 1. The exemplary document rendering method starts in step 802 and proceeds to step 804.

In step 804 the document renderer generates a document object. In step 804 the documents renderer creates a base container based on the document settings, such as page size and orientation, for all contents of the document to reside within. Operation proceeds from step 804 to step 806.

In step 806 the document renderer generates object structure. In step 806 the document renderer takes an inventory of all objects within the document so that they may be individually be processed. Operation proceeds from step 806 to step 808.

In step 808 the document renderer determines if the object is in cache. In step 808 the document renderer does a lookup to determine if the current object has been cached before. Cached objects do not need to be re-rendered and can be used directly. This approach of using a cache makes the rendering process more efficient.

If the determination of step 808 is that the object is not in cache, then operation proceeds from step 808 to step 810. However, if the determination of step 808 is that the object is in cache, then operation proceeds from step 808 to step 832.

In step 810, the document renderer determines if the object is a nested object. Some objects nest another document-type object within themselves. These nested objects run through the entire rendering process as if they were standalone documents. If the determination of step 810 is that the object is not a nested object, then operation proceeds from step 810 to step 812. However, if the determination of step 810 is that the object is a nested object, then operation proceeds from step 810 to step 816.

In step 812 the document renderer calculates object style. In step 812 the document renderer reads the compounded style for an object, looking for style items that will contribute to the amount of x/y space an object will take up within a document, and calculates that space.

Operation proceeds from step 812 to step 814.

In step 814, the document renderer determines object type. In step 814 the document renderer checks for container type objects (i.e. grouping of many paragraph objects), paragraph objects, or other types of objects that do not require line and word measurements.

If the document renderer determines that the object type is a container type object, then operation proceeds from step 814 to step 816. If the document renderer determines that the object type is a paragraph type object, then operation proceeds from step 814 to step 818. If the document renderer determines that the object type is other, then operation proceeds from step 814 to step 830.

In step 816 the document renderer generates a container object. In step 816 the document renderer iterates over each of the objects within a container and runs through the paragraph branch. Operation proceeds from step 816 to step 818.

In step 818 the document renderer generates object lines. In step 818 the document renderer splits the textual content of a paragraph up into as many lines as are required to fit in the document. Operation proceeds from step 818 to steps 820 and 822.

Operation proceeds from steps 820 and 822 to step 824. In step 824 the document renderer generates word ranges. In step 824 the document render splits a line into smaller word ranges based on styles applied to letters within in a line. For example, a word in bold is considered its own range. Operation proceeds from step 824 to steps 826 and 828.

In step 826 the document renderer calculates word range style. In step 826 the document renderer reads the compounded style for the range, looking for style items that will contribute to the amount of x/y space the range will take up.

In step 828 the document renderer calculates word range metrics. In step 828 the document renderer calculate the amount of space actually used by the range based on the content on the range and the styles calculated. Operation proceeds from step 826 and 828 to step 830.

In step 830 the document renderer measures the object. In step 830 the document renderer calculates the amount of space actually used by the entire element. For paragraphs, this is aggregate on the metrics from lines and ranges. For each of the other objects, it is just a raw measure of height and width. Operation proceeds from step 830 to step 832.

In step 832 the document renderer renders the object. In step 832 the document renderer applies the styles to each range and line and outputs them to the browser in the correct location and utilizing the correct space. Operation proceeds from step 832 to step 834 and step 836.

In step 834 the document renderer caches a copy of the object, resulting in cached copy of object 835. Once an object has been successfully rendered, the document renderer, in step 834 caches it for potential reuse. Operation proceeds from step 832 to step 826.

In step 836 the document renderer determines if there is another object. In step 836, the document renderer determines if there is another object in the list, and if there is another object in the list to process then operation proceeds to move on to it and restart the process from step 808, which is a check if the next object being processed is in cache. Thus, if the determination of step 836 is that there is another object, then operation proceeds from step 836 to step 808. However, if the determination of step 836 is that there is not another object, then operation proceeds from step 836 to step 838.

In step 838 the document renderer sends the rendered objects to a page renderer. Thus, in step 838 after each of the elements are rendered, the page rendered sends those objects to the Page Renderer.

Figure 9:
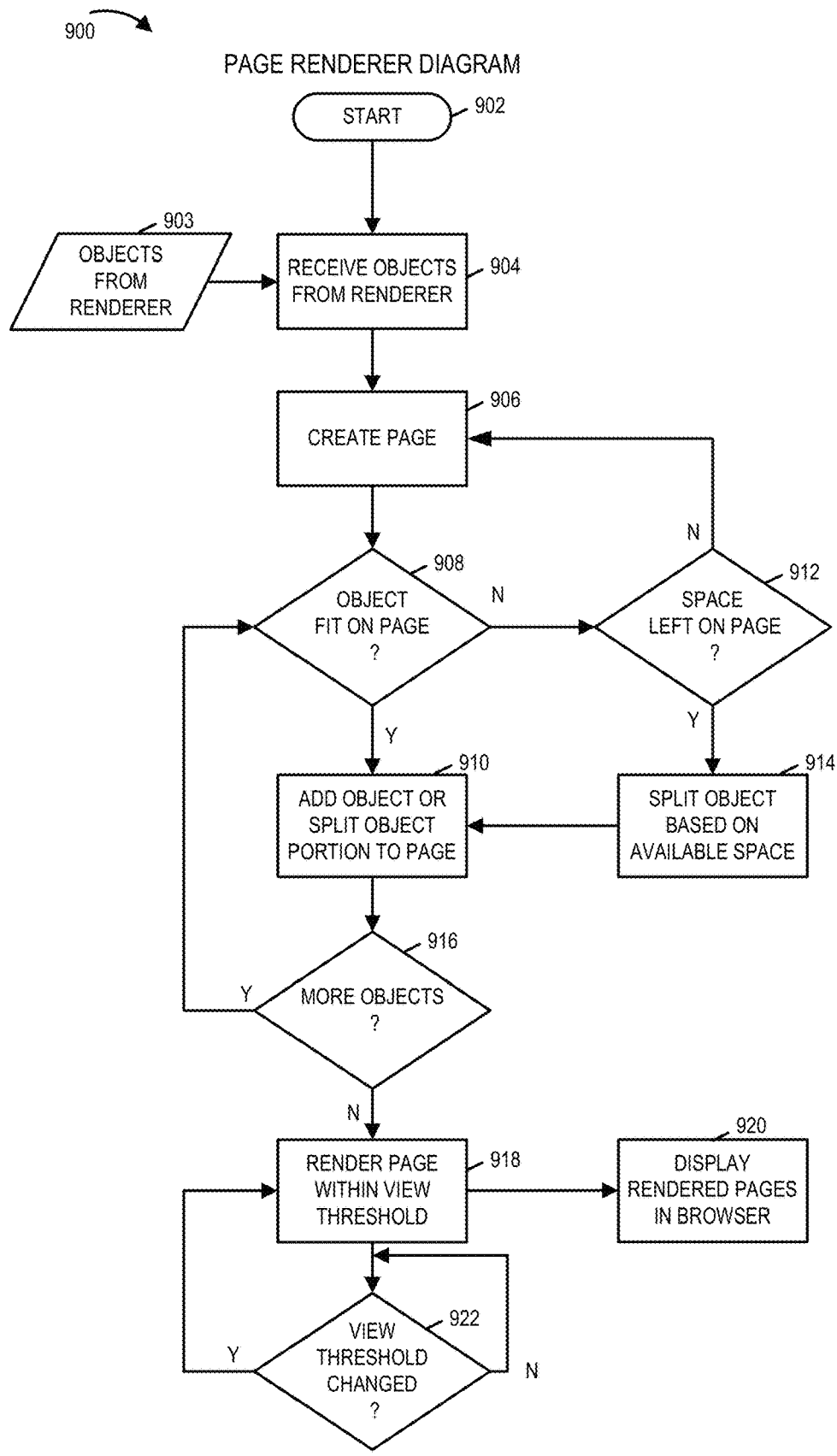
FIG. 9 is a drawing of a flowchart illustrating an exemplary method of page rendering in accordance with an exemplary embodiment.

FIG. 9 is a drawing of a flowchart 900 illustrating an exemplary method of page rendering in accordance with an exemplary embodiment. The exemplary method of flowchart 900 is, e.g., performed by a page renderer, e.g., page renderer 458, included in client device 400 of FIG. 4 or client device 108 of FIG. 1.

Operation of the exemplary method starts in step 902 and proceeds to step 904. In step 904 the page renderer receives objects from the document render 903. Thus, once all the objects for an entire document have been rendered by the document renderer, the objects are received by the Page Renderer. Operation proceeds from step 904 to step 906.

In step 906 the page renderer creates a page. In step 906, the page renderer creates a blank page, ready to accept objects. Operation proceeds from step 906 to step 908.

In step 908 the page renderer determines if the object fits on the page. In step 908 the page renderer determines the amount of space left on the page and determines whether or not the current object has enough room to fit on the page. If the determination of step 908 is that the object fits on the page, then operation proceeds from step 908 to step 910. However, if the determination is that the object does not fit on the page then operation proceeds from step 908 to step 912.

In step 910 the page renderer adds an object or a split object portion to the page. In step 910, if operation proceeded from step 908, then the page renderer adds the object to the current page. In step 910 if the operation proceeded from step 914, then the page renderer add a split object portion to the current page. Operation proceeds from step 910 to step 916.

In step 912 the page renderer determines if there is space left on the page. In step 912 the page render determines if there is any available space left on a page to accept more objects. If there is not, then operation proceeds to step 906 to create a new page. If there is available space left on the page to accept more objects, then operation proceeds to step 914 to split object based on available space.

Thus, if the determination of step 912 is that there is not any space left on the page, then operation proceeds from step 912 to step 906, in which the page renderer creates a page. However, if the determination of step 912 is that there is space left on the page, then operation proceeds from step 912 to step 914, in which the page renderer splits the object based on available space. Operation proceeds from step 914 to step 910.

In step 916 the page renderer determines if there are more objects. In step 916 the page renderer determines if there are still objects remaining in the render queue. If the determination of step 916 is that there are more objects, e.g., objects remaining in the render queue, then operation proceeds from step 916 to step 908, in which the page renderer determines if the object fits on the page. However, if the determination of step 916 is that there not any are more objects, then operation proceeds from step 916 to step 918.

In step 918 the page renderer renders the page within view threshold. Once all objects have been rendered on their pages, the page renderer determines the current view threshold. A view threshold is the amount of pages to actively send to the browser as to not overload it with more data than it can handle. For example, if your document has 100 pages, your view threshold might allow 5 pages, a current page and 2 prev/next, to be sent to the browser.

Operation proceeds from step 918 to step 920 and step 922.

In step 920 the page renderer displays the rendered pages in the browser. Thus, once all pages within a view threshold have been rendered to standards-compliant HTML, the client browser renders it.

In step 922 the page renderer determines if the view threshold has changed. As you scroll or move through the document, the view threshold will change based on the page currently in view. As this view changes, operation proceeds from step 922 to step 918. If the determination is that the view threshold has changed then operation proceeds from step 922 to step 918, in which the page render renders the page within the new view threshold, and in step 920 the page renderer display the rendered pages in the browser.

Rendering and editing, in accordance with some embodiments, can be, and sometimes are, supported on a web browser, e.g., a web browser in a client device, which is implementing a rendering application implemented in accordance with an exemplary embodiment, e.g., the document rendering method of flowchart 800 of FIG. 8 and the page rendering method of flowchart 900 of FIG. 9. Various features and/or aspects with regard to rendering and editing, in accordance with some embodiments, are further described below.

Once a single JSON object is created and communicated to the client device by the server, the client-side renderer and editor functions operate on that single object as a mutable source. Multiple edits can be made by the web browser prior to return of the edited JSON object. Mutations to the document made by the web browser result in a state that would be valid as the result of an import and can be properly exported by the server to the OOXML spec when creating an OOXML file from the returned JSON object.

In some embodiments content entities in a document can be treated individually when being processed and incorporated into a JSON object being created by the server for communication to the client device. As part of the server creation of the JSON object to be supplied to a client device content in the rendered document is separated into various hierarchical levels which can be reflected in a tree structure in the JSON object. The document itself is comprised of zero or more sections, each having their own properties for page dimensions and layout. Each section (or the root document when there are no sections) contains a flat array of elements (objects), each defining the content and styling of one block-level displayed element (object) in the Document Object Model (DOM) rendering. In some embodiments text-based elements (objects) are broken down into ranges at any boundary that changes style or other metadata. This allows for discrete handling of specifically-styled content within a larger paragraph of content. Text-based elements (objects) are also broken down in to lines after measuring the content to determine proper break-points. These lines are updated independently of one another during the editing process. Lines often contain multiple ranges and ranges can span multiple lines, breaking the range into multiple DOM elements (objects) at render time.

Figure 10:
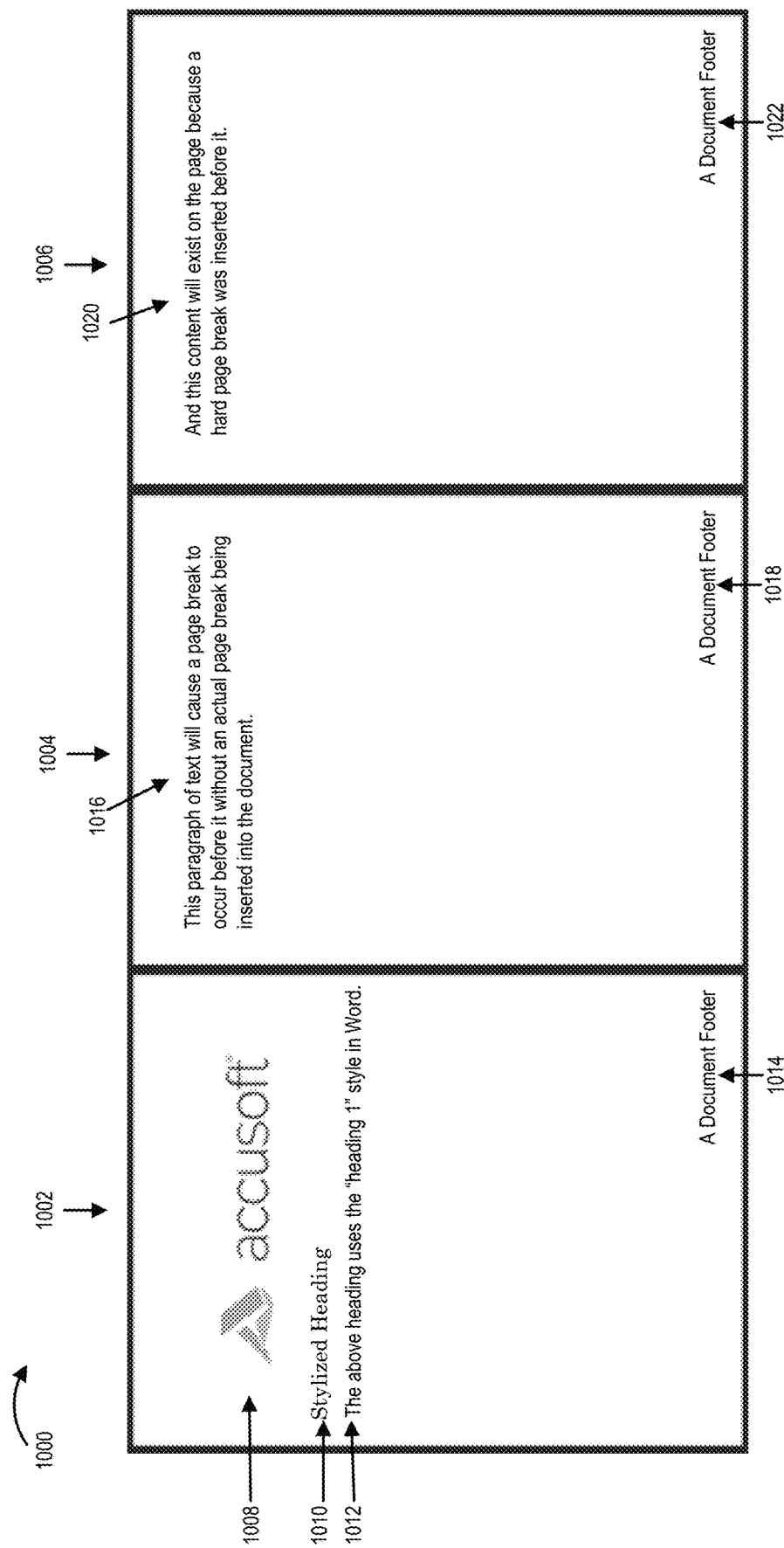
FIG. 10 is a drawing of an exemplary original document, e.g., a Microsoft Word 2016, as displayed on a device, e.g., a server supporting OOXML format.

FIG. 10 is a drawing 1000 of an exemplary original document, e.g., a Microsoft Word 2016, as displayed on a device, e.g., a server supporting OOXML format. Document 1000 includes a first page 1002, a second page 1004 and a third page 1006. First page 1002 includes an image 1008 including a logo, a first block of main body text 1010, a second block of main body text 1012 and a footer 1014. Second page 1004 includes a third block of main body text 1016 and a footer 1018. Third page 1006 includes a fourth block of main body text 1020 and a footer 1022.

Consider that the OOXML document, corresponding to drawing 1000 is converted to a JSON object, including a plurality of JSON objects, in accordance with the present invention, e.g., in accordance with the method of flowchart 200 of FIG. 2, and/or described with respect to the OOXML to JSON conversion steps of FIG. 7.

Several exemplary conversions are shown below.

In a first example, source OOXML input includes a portion of: Patent Examples.docx/word/document.xml file (including a page break command and third block of main body text 1016) which is converted to generate JSON object: Patent Examples.json⇒content[6]. This generated json object (content[6]) is used to represent the third block of main body text 1016 and further includes information for a page break before the text.

Example 1

```
Text + Page Break
Source: Patent Examples.docx/word/document.xml
    <w:p w:rsidR="00A671EC" w:rsidRDefault="00A671EC" w:rsidP="00A671EC">
        <w:pPr>
            <w:pageBreakBefore/>
        </w:pPr>
        <w:r>
            <w:lastRenderedPageBreak/>
            <w:t>This paragraph of text will cause a page break to occur before it without an actual page break being inserted into the document.</w:t>
        </w:r>
    </w:p>
Generates: Patent Examples.json => content[6]
    {
        "type": "p",
        "text": "This paragraph of text will cause a page break to occur before it without an actual page break being inserted into the document.",
        "ranges": [
            {
                "start": 0,
                "end": 128
            }
        ],
        "markers": [ ],
        "paraProps": {
            "pageBreakBefore": {
                "val": 1
            },
            "runProps": {
                "annotations": [ ]
            }
        },
```

```
        "styleProps": {
            "tableProps": { },
            "paraProps": { },
            "runProps": {
                "rFonts": {
                    "asciiTheme": "minorHAnsi",
                    "eastAsiaTheme": "minorHAnsi",
                    "hAnsiTheme": "minorHAnsi",
                    "cstheme": "minorBidi"
                },
                "sz": {
                    "val": 24
                },
                "szCs": {
                    "val": 24
                },
                "lang": {
                    "val": "en-US",
                    "eastAsia": "en-US",
                    "bidi": "ar-SA"
                }
            },
            "merged": {
                "rFonts": {
                    "asciiTheme": "minorHAnsi",
                    "eastAsiaTheme": "minorHAnsi",
                    "hAnsiTheme": "minorHAnsi",
                    "cstheme": "minorBidi"
                },
                "sz": {
                    "val": 24
                },
                "szCs": {
                    "val": 24
                },
                "lang": {
                    "val": "en-US",
                    "eastAsia": "en-US",
                    "bidi": "ar-SA"
                }
            }
        },
        "combinedProps": {
            "pageBreakBefore": {
                "val": 1
            },
            "runProps": {
                "annotations": [ ]
            }
        }
    }
}
```

In a second example, source OOXML input includes: a portion of: Patent Examples.docx/word/document.xml file (including a page break command), which is converted to generate JSON object: PatentExamples.json⇒content[7]. This generated json object (content [7]) is used to generate a page break, e.g., the page break between page 2 and page 3.

Example 2

```
Page Break
            Source: Patent Examples.docx/word/document.xml
            <w:p w:rsidR="00A671EC" w:rsidRDefault="00A671EC">
                <w:r>
                    <w:br w:type="page"/>
                </w:r>
            </w:p>
Generates: Patent Examples.json => content[7]
            {
                "text": "",
                "type": "pagebreak",
```

-continued

```
                "ranges": [
                    {
                        "start": 0,
                        "end": 0,
                        "runProps": { }
                    }
                ],
                "paraProps": {
                    "runProps": {
                        "annotations": [ ]
                    }
                },
                "styleProps": {
                    "tableProps": { },
                    "paraProps": { },
                    "runProps": {
                        "rFonts": {
                            "asciiTheme": "minorHAnsi",
                            "eastAsiaTheme": "minorHAnsi",
                            "hAnsiTheme": "minorHAnsi",
                            "cstheme": "minorBidi"
                        },
```

```
        "sz": {
            "val": 24
        },
        "szCs": {
            "val": 24
        },
        "lang": {
            "val": "en-US",
            "eastAsia": "en-US",
            "bidi": "ar-SA"
        }
    },
    "merged": {
        "rFonts": {
            "asciiTheme": "minorHAnsi",
            "eastAsiaTheme": "minorHAnsi",
            "hAnsiTheme": "minorHAnsi",
            "cstheme": "minorBidi"
        },
        "sz": {
            "val": 24
        },
        "szCs": {
            "val": 24
        },
```

```
            "lang": {
                "val": "en-US",
                "eastAsia": "en-US",
                "bidi": "ar-SA"
            }
        }
    },
    "combinedProps": {
        "runProps": {
            "annotations": [ ]
        }
    }
}
```

In a third example, source OOXML input includes a portion of: Patent Examples.docx/word/document.xml file (including the text in the first block of main body text 1012), and corresponding style information from linked file Examples.docx/word/styles.xml, which is converted to generate json object: Patent examples.json⇒content [2]. The generated json object (content[2]) is used to represent the first block of main body text 1010 and includes style information to achieve the desired style.

Example 3

Text + Style Information Flattened
Source: Patent Examples.docx/word/document.xml
```
    <w:p w:rsidR="00AF2EA9" w:rsidRDefault="00A671EC" w:rsidP="00A671EC">
        <w:pPr>
            <w:pStyle w:val="Heading1"/>
        </w:pPr>
        <w:r>
            <w:t>Stylized Heading</w:t>
        </w:r>
    </w:p>
Links to: Patent Examples.docx/word/styles.xml
    <w:style w:type="paragraph" w:styleId="Heading1">
        <w:name w:val="heading 1"/>
        <w:basedOn w:val="Normal"/>
        <w:next w:val="Normal"/>
        <w:link w:val="Heading1Char"/>
        <w:uiPriority w:val="9"/>
        <w:qFormat/>
        <w:rsid w:val="00A671EC"/>
        <w:pPr>
            <w:keepNext/>
            <w:keepLines/>
            <w:spacing w:before="240"/>
            <w:outlineLvl w:val="0"/>
        </w:pPr>
        <w:rPr>
            <w:rFonts w:asciiTheme="majorHAnsi" w:eastAsiaTheme="majorEastAsia" w:hAnsiTheme="majorHAnsi" w:cstheme="majorBidi"/>
            <w:color w:val="2F5496" w:themeColor="accent1" w:themeShade="BF"/>
            <w:sz w:val="32"/>
            <w:szCs w:val="32"/>
        </w:rPr>
    </w:style>
Links to: Patent Examples.docx/word/styles.xml
    <w:style w:type="paragraph" w:default="1" w:styleId="Normal">
        <w:name w:val="Normal"/>
        <w:qFormat/>
    </w:style>
Generates: Patent Examples.json => content[2]
    {
        "type": "p",
        "text": "Stylized Heading",
        "ranges": [
            {
                "start": 0,
                "end": 16
            }
        ],
```

```
                "markers": [ ],
                "paraProps": {
                    "pStyle": {
                        "val": "Heading1"
                    },
                    "runProps": {
                        "annotations": [ ]
                    }
                }
            },
            "styleProps": {
                "tableProps": { },
                "paraProps": {
                    "keepNext": {
                        "val": 1
                    },
                    "keepLines": {
                        "val": 1
                    },
                    "spacing": {
                        "before": 240
                    },
                    "outlineLvl": {
                        "val": "0"
                    }
                },
                "runProps": {
                    "rFonts": {
                        "asciiTheme": "majorHAnsi",
                        "eastAsiaTheme": "majorEastAsia",
                        "hAnsiTheme": "majorHAnsi",
                        "cstheme": "majorBidi"
                    },
                    "color": {
                        "val": "2F5496",
                        "themeColor": "accent1",
                        "themeShade": "BF"
                    },
                    "sz": {
                        "val": 32
                    },
                    "szCs": {
                        "val": 32
                    },
                    "lang": {
                        "val": "en-US",
                        "eastAsia": "en-US",
                        "bidi": "ar-SA"
                    }
                }
            },
            "merged": {
                "keepNext": {
                    "val": 1
                },
                "keepLines": {
                    "val": 1
                },
                "spacing": {
                    "before": 240
                },
                "outlineLvl": {
                    "val": "0"
                },
                "rFonts": {
                    "asciiTheme": "majorHAnsi",
                    "eastAsiaTheme": "majorEastAsia",
                    "hAnsiTheme": "majorHAnsi",
                    "cstheme": "majorBidi"
                },
                "color": {
                    "val": "2F5496",
                    "themeColor": "accent1",
                    "themeShade": "BF"
                },
                "sz": {
                    "val": 32
                },
                "szCs": {
                    "val": 32
                },
```

```
            "lang": {
                "val": "en-US",
                "eastAsia": "en-US",
                "bidi": "ar-SA"
            }
        }
    },
    "combinedProps": {
        "keepNext": {
            "val": 1
        },
        "keepLines": {
            "val": 1
        },
        "spacing": {
            "before": 240
        },
        "outlineLvl": {
            "val": "0"
        },
        "pStyle": {
            "val": "Heading1"
        },
        "runProps": {
            "annotations": [ ]
        }
    }
}
```

In a fourth example, source OOXML input includes a portion of: Patent Examples.docx/word/document.xml file (including a footer reference), a portion of linked file: Patent Example.docx/word/footer1.xml (including text included in the footer), which is converted to generate json object: Patent examples.json⇒footers [7]. The generated json object (footers[7]) is used to represent the footer, e.g., the footer 1014, 1018 or 1022.

Example 4

Footer Flattened
Source: Patent Examples.docx/word/document.xml
<w:footerReference w:type="default" r:id="rId7"/>
Links to: Patent Examples.docx/word/_rels/document.xml.rels
<Relationship Id="rId7"
Type="http://schemas.openxmlformats.org/officeDocument/2006/relationships/footer"
Target="footer1.xml"/>
Links to: Patent Examples.docx/word/footer1.xml
<w:p w:rsidR="00405585" w:rsidRDefault="00405585" w:rsidP="00405585">
    <w:pPr>
        <w:pStyle w:val="Footer"/>
        <w:jc w:val="right"/>
    </w:pPr>
    <w:r>
        <w:t>A Document Footer</w:t>
    </w:r>
</w:p>
Generates: Patent Examples.json => footers[7]
    {
        "file": "footer1.xml",
        "content": [
            {
                "type": "p",
                "text": "A Document Footer",
                "ranges": [
                    {
                        "start": 0,
                        "end": 17
                    }
                ],
                "markers": [ ],
                "paraProps": {
                    "pStyle": {
                        "val": "Footer"
                    }, -continued

```
        "jc": {
            "val": "right"
        },
        "runProps": {
            "annotations": [ ]
        }
    },
    "styleProps": {
        "tableProps": { },
        "paraProps": {
            "tabs": {
                "val": 1,
                "tab": [
                    {
                        "val": "center",
                        "pos": 4680
                    },
                    {
                        "val": "right",
                        "pos": 9360
                    }
                ],
                "_children": [
                    "tab"
                ]
            }
        },
        "runProps": {
            "rFonts": {
                "asciiTheme": "minorHAnsi",
                "eastAsiaTheme": "minorHAnsi",
                "hAnsiTheme": "minorHAnsi",
                "cstheme": "minorBidi"
            },
            "sz": {
                "val": 24
            },
            "szCs": {
                "val": 24
            },
            "lang": {
                "val": "en-US",
                "eastAsia": "en-US",
                "bidi": "ar-SA"
            }
        },
        "merged": {
            "tabs": {
                "val": 1,
                "tab": [
                    {
                        "val": "center",
                        "pos": 4680
                    },
                    {
                        "val": "right",
                        "pos": 9360
                    }
                ],
                "_children": [
                    "tab"
                ]
            },
            "rFonts": {
                "asciiTheme": "minorHAnsi",
                "eastAsiaTheme": "minorHAnsi",
                "hAnsiTheme": "minorHAnsi",
                "cstheme": "minorBidi"
            },
            "sz": {
                "val": 24
            },
            "szCs": {
                "val": 24
            },
```

```
            "lang": {
                "val": "en-US",
                "eastAsia": "en-US",
                "bidi": "ar-SA"
            }
        }
    },
    "combinedProps": {
        "tabs": {
            "val": 1,
            "tab": [
                {
                    "val": "center",
                    "pos": 4680
                },
                {
                    "val": "right",
                    "pos": 9360
                }
            ],
            "_children": [
                "tab"
            ]
        },
        "pStyle": {
            "val": "Footer"
        },
        "jc": {
            "val": "right"
        },
        "runProps": {
            "annotations": [ ]
        }
    }
}
```

In a fifth example, source OOXML input includes a portion of: Patent Examples.docx/word/document.xml file (including information used to generate image 1008), which is converted to generate json object: Patent examples.json⇒content [1].

The fifth example, referred to as EXAMPLE 5, is included in a Computer Program Listing Appendix that is in the form of a file having the file name: ComputerProgramListingAppendixSN16359739.txt which has a creation date of Jun. 12, 2022 and a file size of 54,338 bytes, said file and text included therein being hereby expressly incorporated by reference in its entirety.

Figure 11:
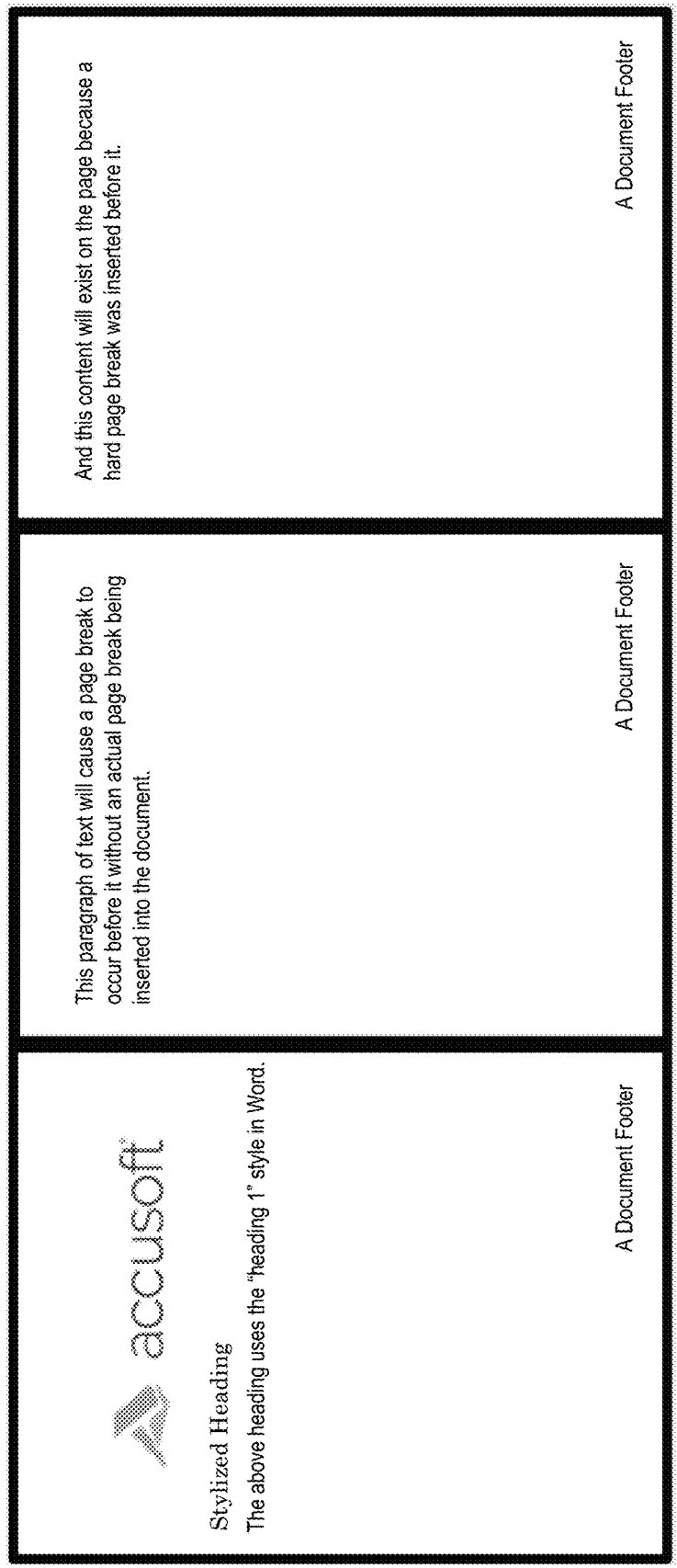
FIG. 11 is a drawing of a rendered document, which has been rendered in accordance with the methods of the present invention, e.g., in a browser, e.g. a Google Chrome browser, running an exemplary rendering application, in accordance with the present invention, wherein the input to the rendering is the JSON object file sent from the server, after converting the OOXML document of FIG. 10 to JSON.

FIG. 11 is a drawing 1100 of rendered document, which has been rendered in accordance with the methods of the present invention, e.g., in a browser, e.g. a Google Chrome browser running an exemplary rendering application, in accordance with the present invention, wherein the input to the rendering is the JSON object file sent from the server, after converting the OOXML document of FIG. 10 to JSON. A visual comparison of the original OOXML document of FIG. 10 and the browser rendered document, generated from the JSON object, of FIG. 11 illustrate that the two visual representations appear identical or nearly identical, with text positioning, styling, location, and image representations appearing to be the same.

Numbered List of Exemplary Method Embodiments:

Method Embodiment 1 A method, comprising: extracting (206), at a processing device (e.g., server) one or more XML files (381, 382, 383, 384) and zero or more non-XML files (385) from a first OOXML file representing a first document, said one or more XML files including at least a first XML file; and generating (212) a first file including JSON objects used to represent the first document.

Method Embodiment 2 The method of Method Embodiment 1, wherein said zero or more non-XML files includes at least a first non-XML file; and wherein said first non-XML file is a first binary file representing a binary object.

Method Embodiment 3 The method of Method Embodiment 2, wherein generating (212) a first file including JSON objects used to represent the first document includes: generating (218) a javascript object notation (JSON) object (386) from at least the first XML file, said JSON object being a first JSON object; embedding (216) binary data from the first binary file into a second JSON object (391); and combining (258) the first and second JSON objects (386, 391) into the first file (392) to thereby generate the first file (392) including JSON objects used to represent the first OOXML document.

Method Embodiment 4 The method of Method Embodiment 3, wherein generating (212) the first file including JSON objects used to represent content of the first document further includes: flattening (250, 250, 238, or 244) one of: annotations, comments, a header, or a footer extracted from the first OOXML file representing the first document; and including the flattened annotations, comments, header, or footer in a third JSON object (389, 389, 387, or 388); and including (258) the third JSON object in the first file (392).

Method Embodiment 5 The method of Method Embodiment 4, wherein generating (218) said first JSON object includes incorporating (230) at least one of style and theme data into said first JSON object (386).

Method Embodiment 6 The method of Method Embodiment 4 wherein generating (212) the first file including JSON objects used to represent the first document further includes: generating (220) a fourth JSON object in said first file (292), said fourth object (387) being generated from a header in an XML file including marginal content (381).

Method Embodiment 7 The method of Method Embodiment 4 wherein generating (212) the first file including JSON objects used to represent the first document further includes: generating (222) a fourth JSON object (388) in said first file, said fourth object being generated from a footer in an XML file including marginal content (381).

Method Embodiment 8 The method of Method Embodiment 4 wherein generating (212) the first file including JSON objects used to represent the first document further includes: generating (222) a fourth JSON object (389) in said first file, said fourth object (389) being generated from at least one comment extracted from an XML comment file (382).

Method Embodiment 9 The method of Method Embodiment 1, further comprising: receiving (205), at the processing device (e.g., server), a document request from a client device; communicating (262) (e.g., sending) the first file (392) including JSON objects to the client device in response to said request.

Method Embodiment 10 The method of Method Embodiment 9, wherein said document request is an HTTP request for the first document.

Method Embodiment 11 The method of Method Embodiment 9, further comprising: receiving (264) at the client device the first file including JSON objects; and operating (269) the client device to display document content included in the first file to a user; and receiving (270) user input modifying document content.

Method Embodiment 12 The method of Method Embodiment 11, wherein said client device is a cell phone.

Method Embodiment 13 The method of Method Embodiment 9, further comprising: receiving (276), at the processing device (e.g., server) from the client device a second file including a JSON object representing a modified version of the first document.

Method Embodiment 14 The method of Method Embodiment 13, wherein said JSON object representing a modified version of the first document, includes an array of JSON objects.

Method Embodiment 15 The method of Method Embodiment 13, further comprising: operating (280) the processing device (e.g., server) to generate one or more XML output files from one or more JSON objects included in the received second file; and operating (294) the processing device (e.g., server) to pack the output XML files into a second OOXML file, said second OOXML file representing a modified version of the first document.

Method Embodiment 16 The method of Method Embodiment 15, further comprising: storing (298) the second OOXML file in place of said first OOXML file in a memory device.

Method Embodiment 17 The method of Method Embodiment 15, wherein operating (280) the processing device (e.g., server) to generate one or more XML output files includes: operating (282) the processing device (e.g., server) to rewrite JSON object content including text content, from said second JSON file, into multiple different XML files.

Method Embodiment 18 The method of Method Embodiment 17, wherein rewriting (282) JSON object content includes extracting (288) content for each of at least a main body document area, header document area and footer document area from different objects included in the second file and including the extracted content in a respective corresponding main body document area XML file, header document area XML file, and footer document area XML file.

Method Embodiment 19 The method of Method Embodiment 17, wherein operating (280) the processing device (e.g., server) to generate one or more XML output files further includes: rewriting (284) style and theme data included in a JSON object of the received second file into XML style information.

Method Embodiment 20 The method of Method Embodiment 17, wherein operating (280) the processing device (e.g., server) to generate one or more XML output files further includes: creating (286) a single XML file for each annotation note or comment included in a JSON object of the second file which conveys an aggregate of annotated notes and comments.

Method Embodiment 21 The method of Method Embodiment 17, further comprising: operating (290) the processing device (e.g., server) to generate one or more binary files from one or more JSON objects included in the received second file.

Method Embodiment 22 The method of Method Embodiment 21, wherein operating (290) the processing device (e.g., server) to generate one or more binary files from one or more JSON objects included in the received second file includes: decoding (292) an encoded representation of a binary object to generate a binary representation of the binary object.

Method Embodiment 23 The method of Method Embodiment 21, wherein said encoded representation of the binary object was included in a string included in a JSON object.

Method Embodiment 24 The method of Method Embodiment 21, wherein the binary objects included in the JSON objects in encoded form are binary objects which were encoded using base 64 encoding and wherein said decoding includes decoding of base 64 encoded objects.

Numbered List of Exemplary System Embodiments:

System Embodiment 1 A system (100), comprising: a server (102) including: an interface (304) including a receiver (316) and a transmitter (318); memory (312); and a processor (302) configured to: extract (206) one or more XML files (381, 382, 383, 384) and zero or more non-XML files (385) from a first OOXML file representing a first document, said one or more XML files including at least a first XML file; and generate (212) a first file including JSON objects used to represent the first document.

System Embodiment 2 The system (100) of System Embodiment 1, wherein said zero or more non-XML files includes at least a first non-XML file; and wherein said first non-XML file is a first binary file representing a binary object.

System Embodiment 3 The system (100) of System Embodiment 2, wherein the processor (302) is configured, as part of being configured to generate (212) a first file including JSON objects used to represent the first document to: generate (218) a javascript object notation (JSON) object (386) from at least the first XML file, said JSON object being a first JSON object; embed (216) binary data from the first binary file into a second JSON object (391); and combine (258) the first and second JSON objects (386, 391) into the first file (392) to thereby generate the first file (392) including JSON objects used to represent the first OOXML document.

System Embodiment 4 The system (100) of System Embodiment 3, wherein the processor (302) is configured, as part of being configured to generate (212) a first file including JSON objects used to represent the first document to:

flatten (250, 250, 238, or 244) one of: annotations, comments, a header, or a footer extracted from the first OOXML file representing the first document; include the flattened annotations, comments, header, or footer in a third JSON object (389, 389, 387, or 388); and include (258) the third JSON object in the first file (392).

System Embodiment 5 The system (100) of System Embodiment 4, wherein the processor (302) is further configured, as part of being configured to generate (218) said first JSON object to: incorporate (230) at least one of style and theme data into said first JSON object (386).

System Embodiment 6 The system (100) of System Embodiment 4 wherein the processor (302) is further configured, as part of being configured to generate (212) a first file including JSON objects used to represent the first document to: generate (220) a fourth JSON object in said first file (292), said fourth object (387) being generated from a header in an XML file including marginal content (381).

System Embodiment 7 The system (100) of System Embodiment 4 wherein the processor (302) is further configured, as part of being configured to generate (212) the first file including JSON objects used to represent the first document to: generate (222) a fourth JSON object (388) in said first file, said fourth object being generated from a footer in an XML file including marginal content (381).

System Embodiment 8 The system (100) of System Embodiment 4 wherein the processor (302) is further configured, as part of being configured to generate (212) a first file including JSON objects used to represent the first document to: generate (222) a fourth JSON object (389) in said first file, said fourth object (389) being generated from at least one comment extracted from an XML comment file (382).

System Embodiment 9 The system (100) of System Embodiment 1, wherein said processor (302) is further configured to: control the receiver (316) to receive a document request from a client device (108); and control the transmitter (318) to communicate (262) (e.g., send) the first file (392) including JSON objects to the client device (108) in response to said request.

System Embodiment 10 The system (100) of System Embodiment 9, wherein said document request is an HTTP request for the first document.

System Embodiment 11 The system (100) of System Embodiment 9, further comprising: said client device (108) including: a display (426); a client device receiver (434 or 430) configure to receive (264) the first file including JSON objects; and a client device processor (402) configured to control the client device (108) to display document content included in the first file on the display; and an user input device (422, 424, or 426) configured to receive (270) user input modifying document content.

System Embodiment 12 The system (100) of System Embodiment 11, wherein said client device (108) is a cell phone.

System Embodiment 13 The system (100) of System Embodiment 9, wherein the receiver (316) included in the server (102) is further configured to receive, from the client device (108) a second file including a JSON object representing a modified version of the first document.

System Embodiment 14 The system (100) of System Embodiment 13, wherein said JSON object representing a modified version of the first document, includes an array of JSON objects.

System Embodiment 15 The system (100) of System Embodiment 13, wherein the processor (302) in the server (102) is further configured to: generate one or more XML output files from one or more JSON objects included in the received second file; and pack the output XML files into a second OOXML file, said second OOXML file representing a modified version of the first document.

System Embodiment 16 The system (100) of System Embodiment 15, wherein the processor (302) in the server (102) is further configured to: store (298) the second OOXML file in place of said first OOXML file in a memory device (312 or 110).

System Embodiment 17 The system (100) of System Embodiment 15, wherein the processor (302) in the server (102) is further configured, as part of being configured to generate one or more XML output files to: rewrite JSON object content including text content, from said second JSON file, into multiple different XML files.

System Embodiment 18 The system (100) of System Embodiment 17, wherein rewriting (282) JSON object content includes extracting (288) content for each of at least a main body document area, header document area and footer document area from different objects included in the second file and including the extracted content in a respective corresponding main body document area XML file, header document area XML file, and footer document area XML file.

System Embodiment 19 The system (100) of System Embodiment 17, wherein the processor (302) in the server is further configured, as part of being configured to generate one or more XML output files to: rewrite (284) style and theme data included in a JSON object of the received second file into XML style information.

System Embodiment 20 The system (100) of System Embodiment 17, wherein the processor (302) in the server (102) is further configured as part of being configured to generate one or more XML output files to: create (286) a single XML file for each annotation note or comment included in a JSON object of the second file which conveys an aggregate of annotated notes and comments.

System Embodiment 21 The system (100) of System Embodiment 17, wherein the processor (302) in the server (102) is further configured to: generate one or more binary files from one or more JSON objects included in the received second file.

System Embodiment 22 The system (100) of System Embodiment 21, wherein the processor (302) in the server (102) is further configured, as part of being configured to generate one or more binary files from one or more JSON objects included in the received second file to: decode (292) an encoded representation of a binary object to generate a binary representation of the binary object.

System Embodiment 23 The system (100) of System Embodiment 21, wherein said encoded representation of the binary object was included in a string included in a JSON object.

System Embodiment 24 The system (100) of System Embodiment 21, wherein the binary objects included in the JSON objects in encoded form are binary objects which were encoded using base 64 encoding and wherein said decoding includes decoding of base 64 encoded objects.

Numbered List of Computer Readable Medium Embodiments:

Computer Readable Medium Embodiment 1 A non-transitory computer readable medium (312) including a set of computer executable instructions which when executed by a processor (302) of a processing device (102), (e.g. server) cause the processing device (102) to perform the steps of: extracting (206), at the processing device (e.g., server) one or more XML files (381, 382, 383, 384) and zero or more non-XML files (385) from a first OOXML file representing a first document, said one or more XML files including at least a first XML file; and generating (212) a first file including JSON objects used to represent the first document.

The techniques of various embodiments may be implemented using software, hardware and/or a combination of software and hardware. Various embodiments are directed to apparatus, e.g., an image processing device or system. Various embodiments are also directed to methods, e.g., a method of extracting, e.g., copying to a clipboard, and using data/information from a user selected area of a displayed web page. Various embodiments are also directed to machine, e.g., computer, readable medium, e.g., ROM, RAM, CDs, hard disks, etc., which include machine readable instructions for controlling a machine to implement one or more steps of a method.

In various embodiments apparatus described herein are implemented using one or more components to perform the steps corresponding to one or more methods. Thus, in some embodiments various features are implemented using components. Such components may be implemented using software, hardware or a combination of software and hardware. In some embodiments in which the components are implemented in hardware, the components are implemented as circuits, e.g., of a processor. In many or all of the above described embodiments, methods and/or method steps can, and in some embodiments are, implemented using computer executable instructions, such as software, included in a computer readable medium, e.g., a non-transitory computer readable medium, such as a memory device, e.g., RAM, floppy disk, etc. which when executed control a machine, e.g., general purpose computer or processor, with or without additional hardware, to implement all or portions of the above described methods. Accordingly, among other things, various embodiments are directed to a computer readable medium including computer executable instructions for causing a machine, e.g., processor or computer system, to perform one or more of the steps of the above-described method(s). Each of the steps of the method may be, and sometimes, are implemented by a circuit with different circuits being used for each of the different steps in some but not all embodiments.

Some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., an image processing device or system. In some embodiments, the image processing device is a desktop computer. In some embodiments the image processing device is a portable device, e.g., a laptop computer, handheld computer, tablet computer, smart phone, personal data assistant, etc., with a processor that implements the method.

In some embodiments components are implemented using software, in other embodiments components are implemented in hardware, in still other embodiments the components are implemented using a combination of hardware and/or software.

Numerous additional variations on the methods and apparatus of the various embodiments described above will be apparent to those skilled in the art in view of the above description. Such variations are to be considered within the scope of the invention.

What is claimed is:

1. A method of operating a server, the method comprising the steps of:
    extracting, performed by a processing device in the server, multiple XML files from a first OOXML file representing a first document, said multiple XML files including at least a first XML file and a second XML file;
    generating, performed by the processing device, a first file including a single JSON object representing the first document, said single JSON object being a first array of JSON objects, said first array of JSON objects including multiple JSON objects which are arrays of JSON objects, generating the first file including generating a first JSON object from the first XML file and generating a second JSON object from the second XML file and including said first and second JSON objects in said single JSON object; and
    using a transmitter, in the server, to communicate the first file including the single JSON object representing the document to another device.

2. The method of claim 1, further comprising extracting at least a first non-XML file from the first OOXML file; and
    wherein said first non-XML file is a first binary file representing a binary object.

3. The method of claim 2, wherein generating the first file further includes:
    embedding binary data from the first binary file into a third JSON object; and
    combining the first, second, and third JSON objects into the first file to thereby generate the first file.

4. The method of claim 3, wherein generating the first file including JSON objects used to represent content of the first document further includes:
    flattening one of: annotations, comments, a header, or a footer extracted from the first OOXML file representing the first document; and
    including the flattened annotations, comments, header, or footer in a fourth JSON object; and
    including the fourth JSON object in the first file.

5. The method of claim 4, wherein generating said first JSON object includes incorporating main document content into a first JSON object and wherein generating said second JSON object includes incorporating at least one of style and theme data into said second JSON object.

6. The method of claim 1,
    wherein said another device is a client device; and
    wherein the method further comprises:
    receiving, at the processing device, a document request from the client device; and
    wherein said step of using said transmitter includes communicating the first file including the single JSON object representing the document to the client device in response to said request.

7. The method of claim 6, further comprising:
    receiving at the client device the first file including JSON objects; and
    operating the client device to display document content included in the first file to a user; and
    receiving user input modifying document content.

8. The method of claim 7,
    wherein said client device is a cell phone.

9. The method of claim 6, further comprising:
    receiving, at the processing device from the client device, a second file including a JSON object representing a modified version of the first document, said JSON object being a second array of JSON objects.

10. The method of claim 9, further comprising:
operating the processing device to generate multiple XML output files from JSON objects included in the second array of JSON objects; and
operating the processing device to pack the multiple XML output files into a second OOXML file, said second OOXML file representing a modified version of the first document.

11. The method of claim 10, wherein operating the processing device to generate multiple XML output files includes:
operating the processing device to rewrite JSON object content including text content, from said second file, into multiple different XML files.

12. The method of claim 11, wherein rewriting JSON object content includes extracting content for each of at least a main body document area, header document area and footer document area from different JSON objects included in the second file and including the extracted content in a respective corresponding main body document area XML file, header document area XML file, and footer document area XML file.

13. The method of claim 1,
wherein said first XML file includes document annotations;
wherein said second XML file includes comments;
wherein a third XML source file includes a main document portion;
wherein said extracting, performed by a processing device in the server, includes extracting the third XML source file representing the main document portion;
wherein generating first file including a single JSON object representing the first document, includes:
generating said first JSON object in the form of a JSON array of annotations;
generating said second JSON object in the form of a JSON array of comments;
generating a third JSON object representing the main document portion, said third JSON object being a JSON main document source object; and
appending said JSON array of annotations and said JSON array of comments to the JSON main document source object as part of generating said first array of JSON objects including multiple JSON objects which are arrays of JSON objects and which is said single JSON object representing said document.

14. A system, comprising:
a server including:
an interface including a receiver and a transmitter;
memory; and
a processor configured to:
extract multiple XML files from a first OOXML file representing a first document, said multiple XML files including at least a first XML, file and a second XML file; and
generate a first file including a single JSON object representing the first document, said single JSON object being a first array of JSON objects, said first array of JSON objects including multiple JSON objects which are arrays of JSON objects, generating the first file including generating a first JSON object from the first XML file and generating a second JSON object from the second XML file and including said first and second JSON objects in said single JSON object.

15. The system of claim 14, wherein said processor is further configured to extract at least a first non-XML file from the first OOXML file; and
wherein said first non-XML file is a first binary file representing a binary object.

16. The system of claim 15, wherein the processor is configured, as part of being configured to generate a first file including JSON objects used to represent the first document to:
embed binary data from the first binary file into a third JSON object; and
combine the first, second, and third JSON objects into the first file to thereby generate the first file.

17. The system of claim 14, wherein said processor is further configured to:
control the receiver to receive a document request from a client device; and
control the transmitter to communicate the first file including said single JSON object representing the first document to the client device in response to said request.

18. The system of claim 17, further comprising:
said client device including:
a display;
a client device receiver configured to receive the first file including the single JSON object representing the first document;
a client device processor configured to control the client device to display document content included in the first file on the display; and
an user input device configured to receive user input modifying document content.

19. The system of claim 17, wherein the receiver included in the server is further configured to receive, from the client device a second file including a single JSON object representing a modified version of the first document, said single JSON object included in the second file representing the modified version of the first document being a second array of JSON objects.

20. The system of claim 19, wherein the processor in the server is further configured to:
generate multiple XML output files from JSON objects included in the second array of JSON objects; and
operate the processing device to pack the multiple XML, output files into a second OOXML file, said second OOXML file representing a modified version of the first document.

21. A non-transitory computer readable medium including a set of computer executable instructions which when executed by a processor of a processing device, cause the processing device to perform the steps of:
extracting, at the processing device multiple XML files from a first OOXML file representing a first document, said multiple XML files including at least a first XML file and a second XML file; and
generating a first file including a single JSON object representing the first document, said single JSON object being a first array of JSON objects, said first array of JSON objects including multiple JSON objects which are arrays of JSON objects, generating the first file including generating a first JSON object from the first XML file and generating a second JSON object from the second XML file and including said first and second JSON objects in said single JSON object.

* * * * *